US008042381B2

(12) United States Patent
Kaneko et al.

(10) Patent No.: US 8,042,381 B2
(45) Date of Patent: Oct. 25, 2011

(54) KNOCKING DETERMINATION APPARATUS AND KNOCKING DETERMINATION METHOD FOR INTERNAL COMBUSTION ENGINE

(75) Inventors: Rihito Kaneko, Nishikamo-gun (JP); Kenji Kasashima, Nishikamo-gun (JP); Masatomo Yoshihara, Toyota (JP); Kenji Senda, Okazaki (JP); Yuuichi Takemura, Anjo (JP); Shuhei Oe, Kariya (JP)

(73) Assignees: Toyota Jidosha Kabushiki Kaisha, Toyota-shi (JP); Denso Corporation, Kariya-shi (JP)

( * ) Notice: Subject to any disclaimer, the term of this patent is extended or adjusted under 35 U.S.C. 154(b) by 488 days.

(21) Appl. No.: 12/300,643

(22) PCT Filed: May 23, 2007

(86) PCT No.: PCT/JP2007/060945
§ 371 (c)(1), (2), (4) Date: Nov. 13, 2008

(87) PCT Pub. No.: WO2007/139127
PCT Pub. Date: Dec. 6, 2007

(65) Prior Publication Data
US 2009/0158816 A1 Jun. 25, 2009

(30) Foreign Application Priority Data
May 29, 2006 (JP) ................................. 2006-148524

(51) Int. Cl.
*G01L 23/22* (2006.01)
(52) U.S. Cl. ...................................... 73/35.09

(58) Field of Classification Search .................. 73/35.01, 73/35.03, 35.06, 35.09
See application file for complete search history.

(56) References Cited

U.S. PATENT DOCUMENTS

| 7,206,691 B2 * | 4/2007 | Kaneko et al. ................. 701/111 |
| 7,347,081 B2 * | 3/2008 | Inoue et al. .................... 73/35.09 |
| 7,669,459 B2 * | 3/2010 | Yoshihara et al. ............ 73/35.06 |
| 2002/0179053 A1 * | 12/2002 | Kokubo et al. .......... 123/406.33 |
| 2003/0005749 A1 * | 1/2003 | Nishimura .................... 73/35.01 |
| 2004/0103714 A1 | 6/2004 | Fukuoka et al. |
| 2005/0241369 A1 * | 11/2005 | Inoue et al. .................... 73/35.09 |
| 2006/0142925 A1 * | 6/2006 | Kaneko et al. ................. 701/111 |
| 2007/0012090 A1 * | 1/2007 | Yoshihara et al. ............ 73/35.09 |
| 2009/0150058 A1 * | 6/2009 | Kaneko et al. ................. 701/111 |

FOREIGN PATENT DOCUMENTS

| DE | 10 2005 061 851 A1 | 7/2006 |
| EP | 1 586 880 A2 | 10/2005 |
| JP | 5-195869 | 8/1993 |
| JP | 8 19890 | 3/1996 |
| JP | 8-128354 | 5/1996 |

(Continued)

*Primary Examiner* — Freddie Kirkland, III
(74) *Attorney, Agent, or Firm* — Oblon, Spivak, McClelland, Maier & Neustadt, L.L.P.

(57) ABSTRACT

A knocking judgement method for an internal combustion engine, in which an engine ECU executes a program judging whether or not such ones of integrated values calculated by integrating the output of a knock sensor at every five degrees of a crank angle are larger than a tentative knock judgement value, in vibrations of a fourth frequency band containing the resonance frequency of the engine, tentatively judging that a knocking has occurred, in case the integrated value larger than the tentative knock judgement value is a predetermined number or more, and judging that no knocking has occurred, in case the integrated value larger than the tentative knock judgement value is not more than the predetermined number.

18 Claims, 24 Drawing Sheets

FOREIGN PATENT DOCUMENTS

| | | |
|---|---|---|
| JP | 8-246948 | 9/1996 |
| JP | 2003 21032 | 1/2003 |
| JP | 2004-184228 | 7/2004 |
| JP | 2004 353531 | 12/2004 |
| JP | 2005 23902 | 1/2005 |
| JP | 2005 299579 | 10/2005 |
| JP | 2005 330954 | 12/2005 |
| WO | WO 2005/103466 A2 | 11/2005 |

* cited by examiner

KNOCKING DETERMINATION APPARATUS AND KNOCKING DETERMINATION METHOD FOR INTERNAL COMBUSTION ENGINE

TECHNICAL FIELD

The present invention relates to a knocking determination apparatus and a knocking determination method for an internal combustion engine. In particular, the present invention relates to a technique of determining occurrence of knocking based on vibrations in a frequency band including a resonant frequency of an internal combustion engine.

BACKGROUND ART

Conventionally, there have been proposed various methods for determining occurrence of knocking (a knock). For example, a magnitude of a vibration generated in an internal combustion engine is detected, and then is compared with a threshold value in order to determine occurrence of knocking. In the internal combustion engine, however, a vibration may be generated due to seating of an intake valve or an exhaust valve, in addition to the vibration generated due to the knocking. Moreover, a vibration may also be generated due to an operation of an injector (particularly, a direct injection-type injector that directly injects fuel into a cylinder) or a high-pressure pump that supplies fuel to the injector. In a case where these vibrations are detected as noise, it is impossible to distinguish a vibration generated due to knocking from a vibration generated due to noise from the magnitude of the vibration in some instances. In order to solve this problem, there has been proposed a technique of determining occurrence of knocking in consideration of a waveform shape of a vibration.

Japanese Patent Laying-Open No. 2004-353531 discloses a knock control apparatus for an internal combustion engine, and this apparatus determines occurrence of knocking through use of a waveform shape. The knock control apparatus disclosed in Japanese Patent Laying-Open No. 2004-353531 includes a signal detecting part that detects a vibration waveform signal generated in the internal combustion engine, a frequency separating part that separates the vibration waveform signal detected by the signal detecting part into a plurality of frequency components, a waveform shape setting part that sets a knock waveform shape based on a value obtained by integrating magnitudes of the plurality of frequency components separated by the frequency separating part for every predetermined interval corresponding to a predetermined crank angle, a knock determining part that determines occurrence of a knock at the internal combustion engine based on the knock waveform shape set by the waveform shape setting part, and a knock controlling part that controls an operation state of the internal combustion engine in accordance with a result of the determination by the knock determining part.

The knock control apparatus described in this patent publication separates the vibration waveform signal generated in the internal combustion engine into the plurality of frequency components. The knock control apparatus sets the knock waveform shape based on the value obtained by integrating the magnitudes of the plurality of separated frequency components for every predetermined interval corresponding to the predetermined crank angle. Thus, the knock waveform shape can be represented as a sum in respective vibration modes. The knock control apparatus can accurately determine occurrence of a knock at the internal combustion engine through use of this knock waveform shape.

Typically, a magnitude of a vibration generated due to noise attenuates rapidly as its characteristic. On the other hand, a magnitude of a vibration generated due to knocking attenuates gently as its characteristic. With the characteristics described above, normally, it is possible to distinguish the vibration generated due to the noise from the vibration generated due to the knocking from a waveform. However, in a case of a vibration which is generated due to noise and is small in magnitude, a shape of the vibration is similar to that of a vibration which is generated due to knocking in some instances. Consequently, even in a case where a vibration waveform signal is separated into a plurality of frequency components and a knock waveform shape is set by a value obtained by integrating magnitudes of the plurality of separated frequency components for every predetermined interval corresponding to a predetermined crank angle as in the knock control apparatus described in Japanese Patent Laying-Open No. 2004-353531, it is difficult to distinguish the vibration generated due to noise from the vibration generated due to the knocking in some instances. In this case, there is a possibility that the occurrence of the knocking is determined erroneously.

DISCLOSURE OF THE INVENTION

An object of the present invention is to provide a knocking determination apparatus and the like, capable of determining occurrence of knocking with good accuracy, for an internal combustion engine.

According to one aspect of the present invention, a knocking determination apparatus for an internal combustion engine comprises a knock sensor that detects a magnitude of a vibration generated in the internal combustion engine, and a operating unit. The operating unit detects magnitudes of vibrations in a frequency band which includes a resonant frequency of the internal combustion engine among vibrations generated due to knocking in the internal combustion engine, and determines whether or not knocking occurs, based on the magnitudes of the vibrations in the frequency band which includes the resonant frequency of the internal combustion engine.

With this configuration, the knocking determination apparatus detects the magnitudes of the vibrations in the frequency band which includes the resonant frequency of the internal combustion engine among the vibrations generated due to the knocking in the internal combustion engine. When the knocking occurs, a vibration is generated at a specific frequency including the resonant frequency of the internal combustion engine. Among vibrations generated due to noise, a vibration which is relatively high in magnitude appears at the specific frequency including the resonant frequency of the internal combustion engine. Among the vibrations generated due to the noise, on the other hand, a vibration which is relatively low in magnitude does not appear at the resonant frequency of the internal combustion engine. Accordingly, the knocking determination apparatus can distinguish the vibration which is relatively low in magnitude and is generated due to the noise from the vibration which is generated due to the knocking based on the magnitudes of the vibrations at the resonant frequency of the internal combustion engine. Thus, the knocking determination apparatus determines whether or not knocking occurs, based on the detected magnitudes from the frequency band including the resonant frequency. As a result, the knocking determination apparatus can reduce confusion between the vibration generated due to the noise and the vibration generated due to the knocking. Therefore, it is possible to provide a knocking determination apparatus, capable of determining occurrence of knocking with good accuracy, for an internal combustion engine.

Preferably, the operating unit detects the magnitudes of the vibrations in the frequency band which includes the resonant frequency of the internal combustion engine at a plurality of times among the vibrations generated due to the knocking in the internal combustion engine in correspondence with a crank angle, and determines whether or not knocking occurs, based on whether or not the magnitudes which are larger than a predetermined threshold value are detected by a number which is equal to or more than a predetermined number.

With this configuration, the knocking determination apparatus detects the magnitudes of the vibrations in the frequency band which includes the resonant frequency of the internal combustion engine at the plurality of times among the vibrations generated due to the knocking in the internal combustion engine in correspondence with the crank angle. When knocking occurs, the vibrations at the resonant frequency of the internal combustion engine are sustained for a relatively long period of time. Accordingly, the knocking determination apparatus determines whether or not knocking occurs, based on whether or not the magnitudes which are larger than the predetermined threshold value are detected by a number which is equal to or more than the predetermined number. Thus, the knocking determination apparatus can determine occurrence of knocking with good accuracy.

More preferably, the operating unit detects waveforms of vibrations in a frequency band which does not include the resonant frequency of the internal combustion engine among the vibrations generated due to the knocking in the internal combustion engine, determines that no knocking occurs in a case where the magnitudes which are larger than the predetermined threshold value are not detected by a number which is equal to or more than the predetermined number, and further determines whether or not knocking occurs based on the waveforms in a case where the magnitudes which are larger than the predetermined threshold value are detected by a number which is equal to or more than the predetermined number.

With this configuration, when knocking occurs, the vibrations at the resonant frequency of the internal combustion engine are sustained for a relatively long period of time. Therefore, if not, that is, if the magnitudes which are larger than the predetermined threshold value are not detected by a number which is equal to or more than the predetermined number, it can be said that there is a low possibility of occurrence of knocking. Accordingly, in the case where the magnitudes which are larger than the predetermined threshold value are not detected by a number which is equal to or more than the predetermined number, the knocking determination apparatus determines that no knocking occurs. On the other hand, if the magnitudes which are larger than the predetermined threshold value are detected by a number which is equal to or more than the predetermined number, it can be said that there is a possibility of occurrence of knocking. Herein, the vibration which is relatively high in magnitude and is generated due to the noise appears at the resonant frequency of the internal combustion engine in some instances. Therefore, the occurrence of knocking must be analyzed more specifically. It is difficult to distinguish the vibration which is relatively high in magnitude and is generated due to the noise from the vibration which is generated due to the knocking, based on the vibration at the resonant frequency of the internal combustion engine. However, the knocking determination apparatus can distinguish the vibration which is relatively high in magnitude and is generated due to the noise from the vibration which is generated due to the knocking, based on a vibration at another frequency. Accordingly, the knocking determination apparatus determines whether or not knocking occurs, based on the waveforms of the vibrations in the frequency band which does not include the resonant frequency of the internal combustion engine in the case where the magnitudes which are larger than the predetermined threshold value are detected by a number which is equal to or more than the predetermined number. Thus, the knocking determination apparatus can determine occurrence of knocking with better accuracy.

More preferably, the operating unit calculates as the threshold value a value which is larger by a predetermined value than a minimum value of the magnitudes of the vibrations in the frequency band which includes the resonant frequency of the internal combustion engine.

With this configuration, the knocking determination apparatus calculates as the threshold value a value which is larger by the predetermined value than the minimum value of the magnitudes of the vibrations in the frequency band which includes the resonant frequency of the internal combustion engine. Thus, the knocking determination apparatus can calculate a threshold value, based on magnitudes of vibrations generated due to a factor other than knocking or noise, that is, mechanical vibrations of the internal combustion engine itself. Therefore, the knocking determination apparatus can obtain a threshold value suitable for every internal combustion engine.

More preferably, the operating unit calculates as the threshold value a value which is larger by a predetermined value than a median value of the magnitudes of the vibrations in the frequency band which includes the resonant frequency of the internal combustion engine.

With this configuration, the knocking determination apparatus calculates as the threshold value a value which is larger by the predetermined value than the median value of the magnitudes of the vibrations in the frequency band which includes the resonant frequency of the internal combustion engine. Thus, the knocking determination apparatus can calculate a threshold value, based on magnitudes of vibrations generated due to a factor other than knocking or noise, that is, mechanical vibrations of the internal combustion engine itself. Therefore, the knocking determination apparatus can obtain a threshold value suitable for every internal combustion engine.

More preferably, the operating unit calculates as the threshold value a value which is larger by a predetermined value than an average value of a predetermined number of magnitudes selected from the magnitudes of the vibrations in the frequency band which includes the resonant frequency of the internal combustion engine such that smaller magnitudes are selected preferentially.

With this configuration, the knocking determination apparatus calculates as the threshold value a value which is larger by the predetermined value than the average value of the predetermined number of magnitudes selected from the magnitudes of the vibrations in the frequency band which includes the resonant frequency of the internal combustion engine such that smaller magnitudes are selected preferentially. Thus, the knocking determination apparatus can calculate a threshold value, based on magnitudes of vibrations generated due to a factor other than knocking or noise, that is, mechanical vibrations of the internal combustion engine itself. Therefore, the knocking determination apparatus can obtain a threshold value suitable for every internal combustion engine.

BEST MODES FOR CARRYING OUT THE INVENTION

Figure 1:
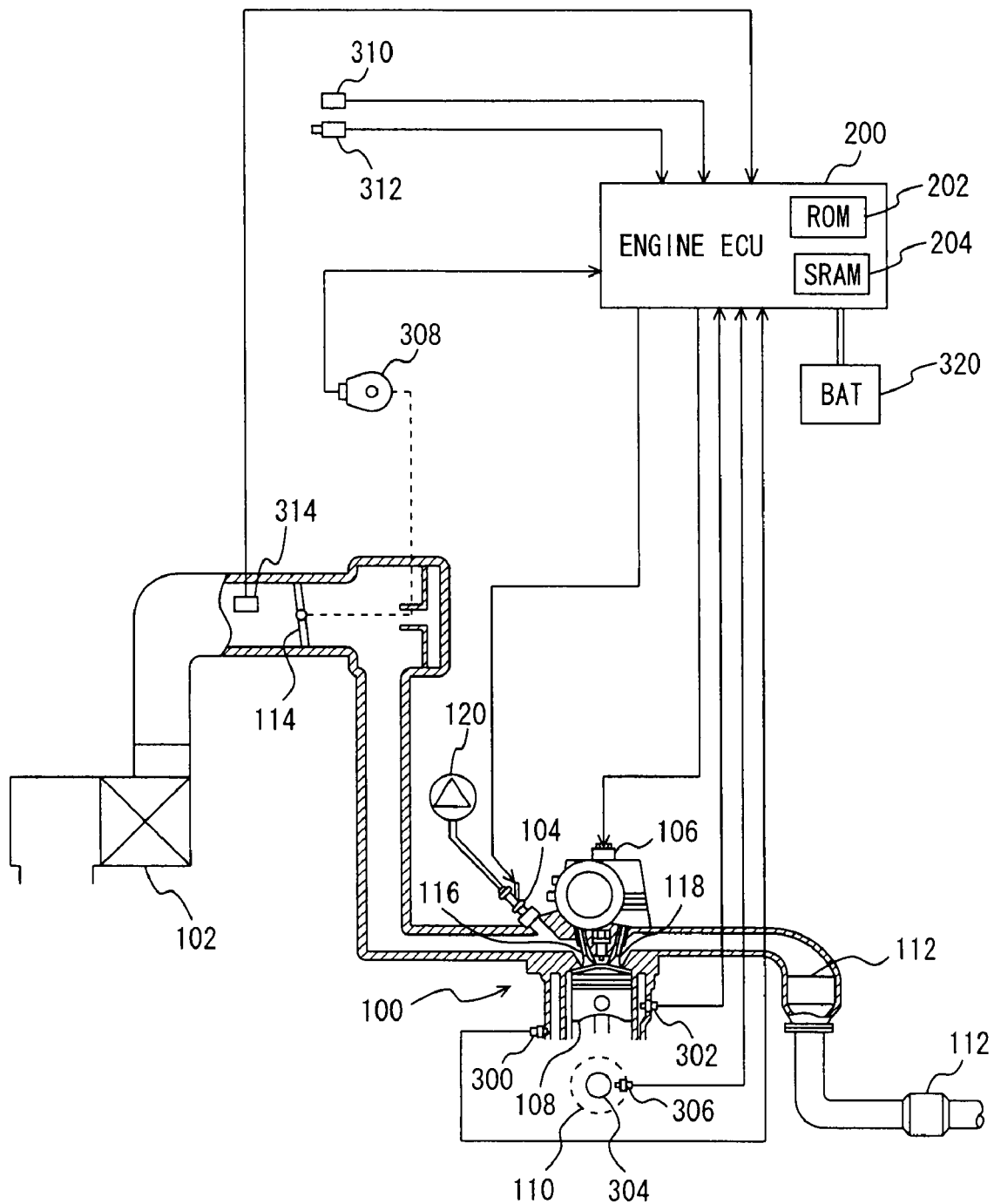
FIG. 1 is a schematic configuration diagram showing an engine controlled by an engine ECU which is a knocking determination apparatus according to one embodiment of the present invention.

Embodiments of the present invention will be described below with reference to the drawings. In the following description, the same parts are provided with the same reference numerals. They have the same names and functions. Therefore, detailed description of the same parts is not repeated.

With reference to FIG. 1, an engine 100 of a vehicle having a knocking determination apparatus according to one embodiment of the present invention will be described. Engine 100 is provided with a plurality of cylinders. The knocking determination apparatus according to the present embodiment is realized by a program executed by an engine ECU (Electronic Control Unit) 200, for example.

Engine 100 is an internal combustion engine in which an air-fuel mixture of air drawn in from an air cleaner 102 and fuel injected from an injector 104 is ignited by a spark plug 106 and burnt in a combustion chamber. An ignition timing is controlled to be MBT (Minimum advance for Best Torque) at which output torque becomes the maximum but is retarded or advanced according to an operation state of engine 100 such as occurrence of knocking.

When the air-fuel mixture is burnt, a piston 108 is pushed down by combustion pressure and a crankshaft 110 is rotated. The air-fuel mixture after combustion (exhaust gas) is cleaned by three-way catalysts 112 and exhausted outside a car. An amount of air drawn into engine 100 is regulated by a throttle valve 114.

Engine 100 is controlled by engine ECU 200. Connected to engine ECU 200 are a knock sensor 300, a water temperature sensor 302, a crank position sensor 306 provided to face a timing rotor 304, a throttle opening sensor 308, a vehicle speed sensor 310, an ignition switch 312, and an air flow meter 314.

Knock sensor 300 is provided to a cylinder block of engine 100. Knock sensor 300 is formed of a piezoelectric element. Knock sensor 300 generates a voltage in response to a vibration of engine 100. A magnitude of the voltage corresponds to a magnitude of the vibration. Knock sensor 300 sends a signal indicating the voltage to engine ECU 200. Water temperature sensor 302 detects a temperature of cooling water in a water jacket of engine 100 and sends a signal indicating the detection result to engine ECU 200.

Timing rotor 304 is provided to crankshaft 110 and rotates with crankshaft 110. On an outer periphery of timing rotor 304, a plurality of protrusions are provided at predetermined intervals. Crank position sensor 306 is provided to face the protrusions of timing rotor 304. When timing rotor 304 rotates, an air gap between the protrusion of timing rotor 304 and crank position sensor 306 changes and, as a result, a magnetic flux passing through a coil portion of crank position sensor 306 increases and decreases to generate an electromotive force in the coil portion. Crank position sensor 306 sends a signal indicating the electromotive force to engine ECU

200. Engine ECU 200 detects a crank angle and the number of rotations of crankshaft 110, based on the signal sent from crank position sensor 306.

Throttle opening sensor 308 detects a throttle opening and sends a signal indicating the detection result to engine ECU 200. Vehicle speed sensor 310 detects the number of rotations of a wheel (not shown) and sends a signal indicating the detection result to engine ECU 200. Engine ECU 200 calculates a vehicle speed based on the number of rotations of the wheel. Ignition switch 312 is turned on by a driver in starting of engine 100. Air flow meter 314 detects the intake air amount into engine 100 and sends a signal indicating the detection result to engine ECU 200.

Engine ECU 200 is activated by electric power supplied from an auxiliary battery 320 which is a power supply. Engine ECU 200 performs computation based on signals sent from the respective sensors and ignition switch 312 and a map and the program stored in a ROM (Read Only Memory) 202 and a SRAM (Static Random Access Memory) 204 and controls the devices so as to bring engine 100 into a desired operation state.

In the present embodiment, engine ECU 200 detects a waveform of a vibration (hereafter, referred to as "a vibration waveform") of engine 100 in a predetermined knock detection gate (a section between a predetermined first crank angle and a predetermined second crank angle), based on the signal sent from knock sensor 300 and the crank angle, and determines whether or not knocking occurs at engine 100, based on the detected vibration waveform. The knock detection gate in the present embodiment is from a top dead center (0°) to 90° in a combustion stroke. It is to be noted that the knock detection gate is not limited thereto.

Figure 2:
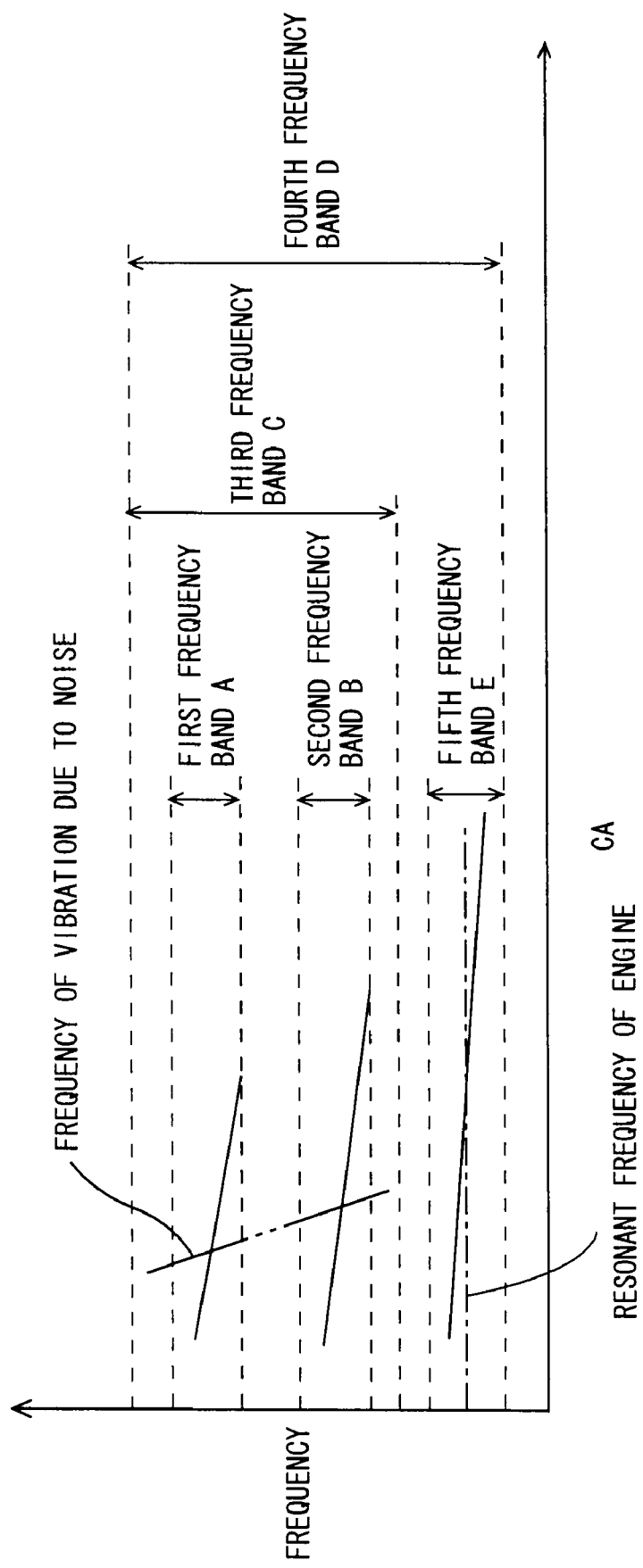
FIG. 2 is a chart showing a frequency band of a vibration generated in the engine.

When knocking occurs, a vibration at a frequency near a frequency shown by a solid line in FIG. 2 is generated in engine 100. The frequency of the vibration generated due to the knocking is not constant and has a predetermined band width. That is, when knocking occurs, vibrations at frequencies included in a first frequency band A, a second frequency band B, and a fifth frequency band E including a resonant frequency (an alternate long and short dash line in FIG. 2) of engine 100 itself are generated in engine 100.

In addition to the vibrations generated due to the knocking, vibrations due to noise (vibrations generated due to operations of an intake valve 116, an exhaust valve 118, injector 104 (particularly, a direct injection-type injector that directly injects fuel into a cylinder), a pump 120 (particularly, a high-pressure pump that supplies fuel to the direct injection-type injector) and the like) are also generated in engine 100.

With regard to the vibrations generated due to the noise, the vibrations which are relatively high in magnitude are generated near a frequency shown by an alternate long and two short dashes line in FIG. 2 and near the resonant frequency of engine 100 itself. That is, the vibrations which are generated due to the noise and are relatively high in magnitude are generated in a third frequency band C which includes first frequency band A and second frequency band B, but does not include fifth frequency band E, and fifth frequency band E.

With regard to the vibrations due to the noise, on the other hand, the vibrations which are relatively low in magnitude are generated only near the frequency shown by the alternate long and two short dashes line in FIG. 2 (third frequency band C). That is, the vibrations which are relatively low in magnitude are not generated near the resonant frequency of engine 100 itself (fifth frequency band E).

With regard to the vibrations described above, in the present embodiment, the vibrations in first frequency band A and second frequency band B (including no resonant frequency of engine 100 itself) are detected among the vibrations generated due to the knocking.

Moreover, the vibrations in wide third frequency band C which includes first frequency band A and second frequency band B, but does not include the resonant frequency of engine 100 itself (fifth frequency band E) are detected. Further, the vibrations in a wide fourth frequency band D which includes first frequency band A, second frequency band B and the resonant frequency of engine 100 itself (fifth frequency band E) are detected. It is to be noted that CA in FIG. 2 designates the crank angle. Moreover, the number of frequency bands including frequencies of vibrations generated due to knocking is not limited to three.

Herein, if the band width of each frequency band is wide, there is a high possibility that the frequency band includes noise other than the vibration generated due to the knocking.

Conversely, if the band width for detecting the vibration is narrow, a noise component contained in a magnitude of a vibration to be detected can be reduced. However, characteristic portions (such as a timing that a vibration is generated, and an attenuation factor of the vibration) of the noise component are removed from a vibration waveform. In this case, a vibration waveform containing no noise component, that is, a waveform similar to a vibration waveform in knocking is detected in actual, with regard to the vibration generated due to the noise component. Consequently, it becomes difficult to distinguish a vibration generated due to knocking from a vibration generated due to noise, based on a vibration waveform.

In order to avoid such a disadvantage, a vibration unique to knocking is extracted with good accuracy in the present embodiment. Therefore, the vibrations in first frequency band A and second frequency band B each of which is narrow in band width are detected.

Moreover, when noise is generated, occurrence of knocking is determined in consideration of the noise. Therefore, the vibrations in wide third frequency band C which includes first frequency band A and second frequency band B but does not include the resonant frequency of engine 100 itself (fifth frequency band E) are detected.

Figure 3:
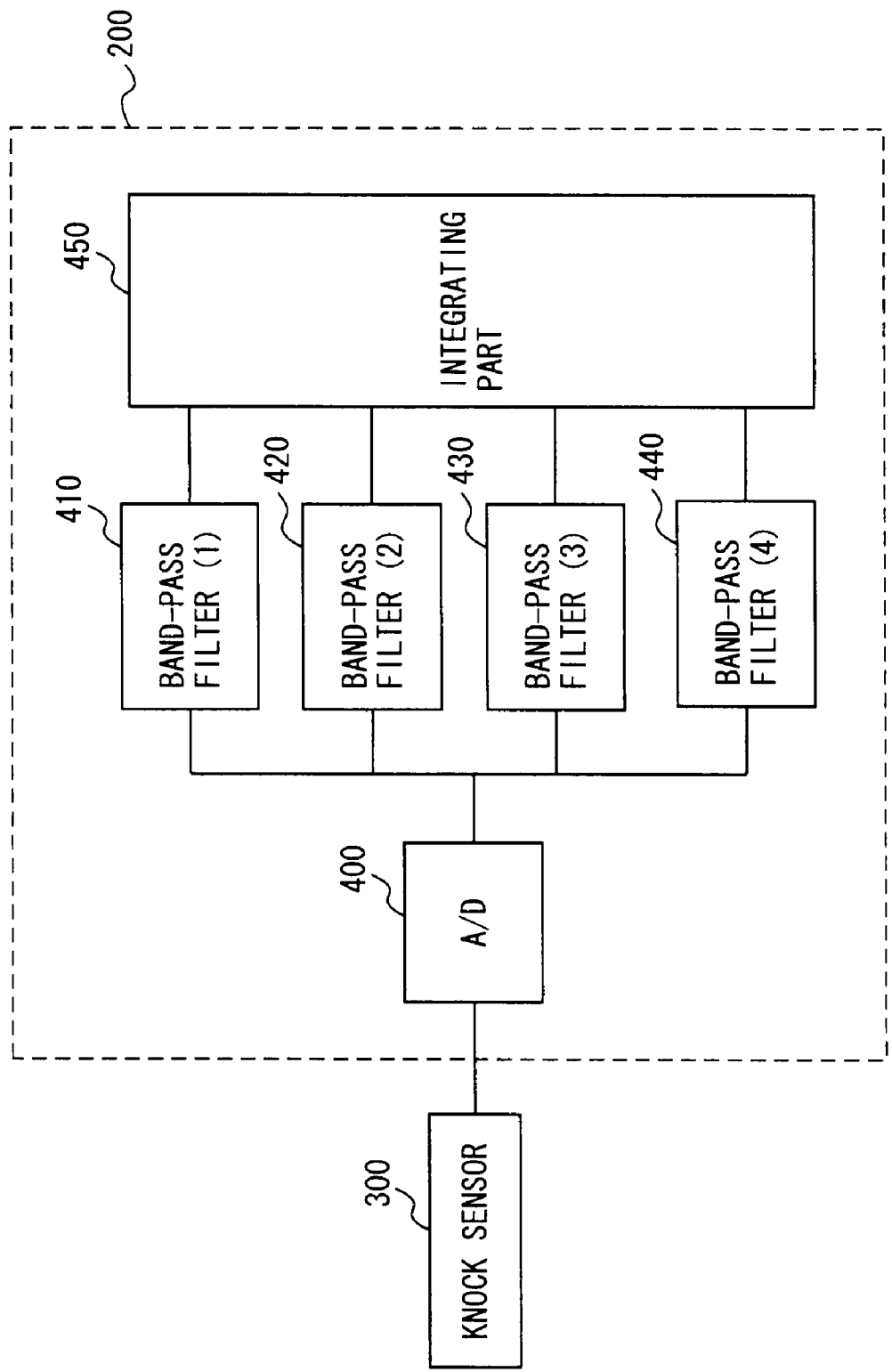
FIG. 3 is a control block diagram showing the engine ECU in FIG. 1.

With reference to FIG. 3, engine ECU 200 will be further described. Engine ECU 200 includes an A/D (Analog/Digital) converting part 400, a band-pass filter (1) 410, a band-pass filter (2) 420, a band-pass filter (3) 430, a band-pass filter (4) 440, and an integrating part 450.

A/D converting part 400 converts an analog signal sent from knock sensor 300 into a digital signal. Band-pass filter (1) 410 allows passage of only signals in first frequency band A among signals sent from knock sensor 300. In other words, by band-pass filter (1) 410, only vibrations in first frequency band A are extracted from vibrations detected by knock sensor 300.

Band-pass filter (2) 420 allows passage of only signals in second frequency band B among signals sent from knock sensor 300. In other words, by band-pass filter (2) 420, only vibrations in second frequency band B are extracted from vibrations detected by knock sensor 300.

Band-pass filter (3) 430 allows passage of only signals in third frequency band C among signals sent from knock sensor 300. In other words, by band-pass filter (3) 430, only vibrations in third frequency band C are extracted from vibrations detected by knock sensor 300.

Band-pass filter (4) 440 allows passage of only signals in fourth frequency band D among signals sent from knock sensor 300. In other words, by band-pass filter (4) 440, only vibrations in fourth frequency band D are extracted from vibrations detected by knock sensor 300.

Integrating part 450 integrates signals selected by bandpass filters (1) 410 to (4) 440, that is, magnitudes of vibrations for every crank angle of 5°. Hereinafter, the value obtained by the integration will be referred to as an integrated value. The integrated value is calculated for every frequency band. By this calculation of the integrated value, the vibration waveform in each frequency band is detected.

Furthermore, the calculated integrated values in first frequency band A and second frequency band B are added to correspond to the crank angles. In other words, the vibration waveforms in first frequency band A and second frequency band B are combined.

Figure 4:
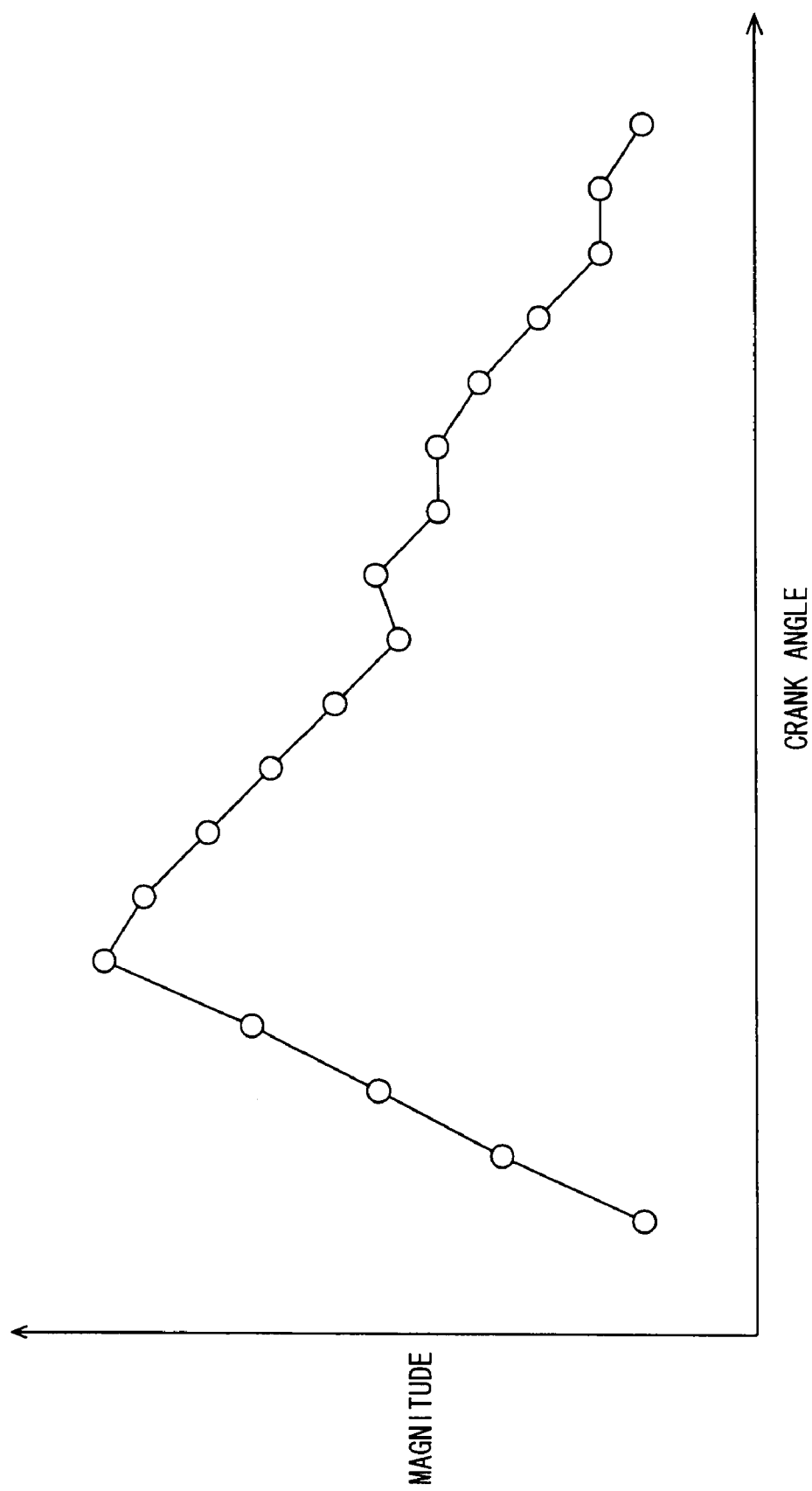
FIG. 4 is a chart showing a vibration waveform in the engine.

As shown in FIG. 4, thus, a vibration waveform of engine 100 is detected. In other words, the composite waveform in first frequency band A and second frequency band B, the vibration waveform in third frequency band C, and the vibration waveform in fourth frequency band D are used as the vibration waveform of engine 100. The vibration waveform in third frequency band C and the vibration waveform in fourth frequency band D (the integrated values) are used singly without being combined.

Figure 5:
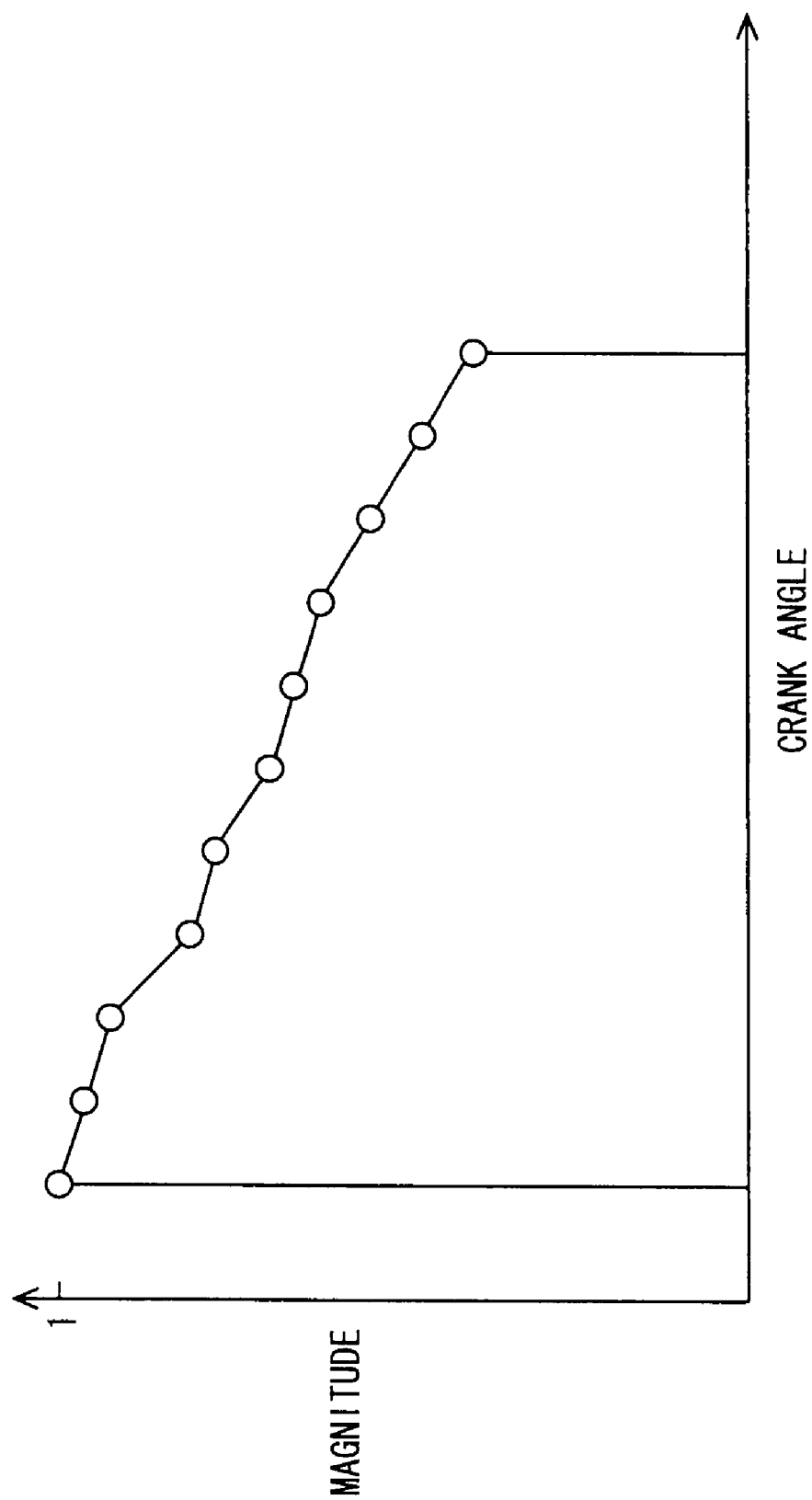
FIG. 5 is a chart showing a knock waveform model stored in a ROM of the engine ECU.

As shown in FIG. 5, the vibration waveform in third frequency band C among the detected vibration waveforms is compared with a knock waveform model stored in ROM 202 of engine ECU 200. The knock waveform model is formed in advance as a model of a vibration waveform in a case where knocking occurs at engine 100.

In the knock waveform model, the magnitudes of the vibrations are expressed as a dimensionless number in a range between 0 and 1 and the magnitude of the vibration does not univocally correspond to the crank angle. In other words, in the knock waveform model in the present embodiment, it is defined that the magnitude of the vibration decreases as the crank angle increases after a peak value of the magnitude of the vibration, but a crank angle at which the magnitude of the vibration becomes the peak value is not defined.

The knock waveform model in the present embodiment corresponds to the vibration after the peak value of the magnitude of the vibration generated due to the knocking. It is to be noted that a knock waveform model corresponding to vibration after a rising edge of the vibration generated due to the knocking may be stored.

The knock waveform model is formed and stored in advance based on a vibration waveform of engine 100 detected in a case where knocking is forcibly caused in experiment and the like.

The knock waveform model is formed by using engine 100 with dimensions of engine 100 and an output value of knock sensor 300 which are median values of dimensional tolerance and tolerance of the output value of knock sensor 300 (hereinafter, referred to as "a median characteristic engine"). In other words, the knock waveform model is a vibration waveform in a case where the knocking is forcibly caused in the median characteristic engine. It is to be noted that a method of forming the knock waveform model is not limited thereto, and the model may be formed by simulation.

Figure 6:
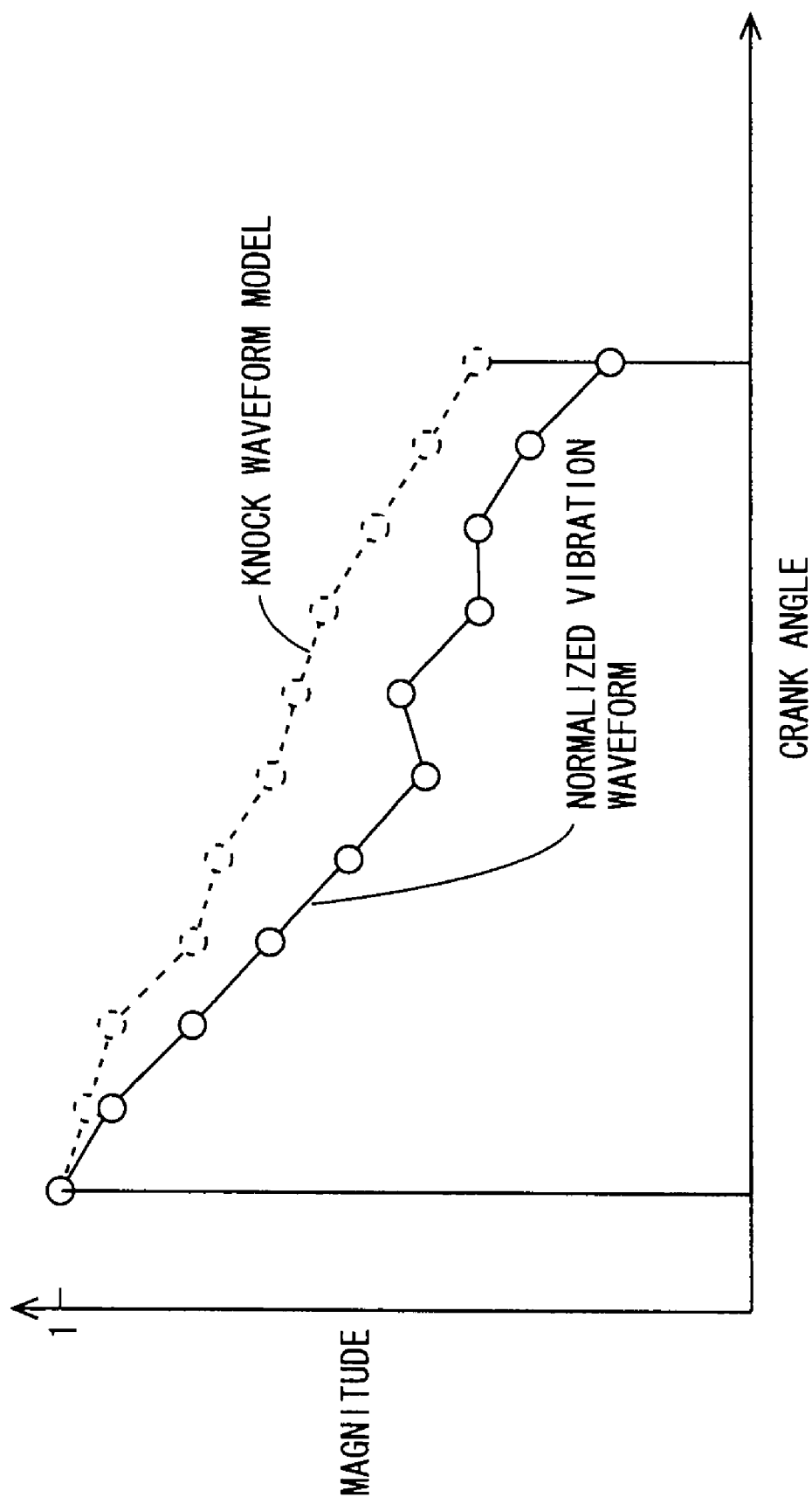
FIG. 6 is a chart (No. 1) for comparing a vibration waveform in a third frequency band C and the knock waveform model.

In comparison between the detected waveform and the knock waveform model, as shown in FIG. 6, a normalized waveform and the knock waveform model are compared with each other. Here, normalization means to express the magnitude of the vibration as a dimensionless number in a range between 0 and 1 by dividing each integrated value by a maximum value of the integrated value in the detected vibration waveform, for example. It is to be noted that a method of the normalization is not limited thereto.

In the present embodiment, engine ECU 200 calculates a correlation coefficient K which is a value related to a deviation of the normalized vibration waveform and the knock waveform model from each other. With a timing at which the magnitude of the vibration becomes a maximum value in the vibration waveform after the normalization and a timing at which the magnitude of the vibration becomes a maximum value in the knock waveform model being made coincident with each other, an absolute value (a deviation amount) of the deviation of the vibration waveform after the normalization and the knock waveform model from each other is calculated at every crank angle (5°) to thereby calculate correlation coefficient K.

When the absolute value of the deviation of the vibration waveform after the normalization and the knock waveform model from each other for every crank angle is $\Delta S(I)$ (I is a natural number) and a value (an area of the knock waveform model) obtained by integrating the magnitude of the vibration in the knock waveform model by the crank angle is S, correlation coefficient K is calculated by an equation, $K=(S-\Sigma\Delta S(I))/S$, where $\Sigma\Delta S(I)$ is the total of $\Delta S(I)$. In the present embodiment, the closer a shape of the vibration waveform to a shape of the knock waveform model, the greater value correlation coefficient K is calculated as. Therefore, if a waveform of vibration generated by factors other than the knocking is included in the vibration waveform, correlation coefficient K is calculated as a small value. It is to be noted that a method of calculating correlation coefficient K is not limited thereto.

The vibration waveform in wide third frequency band C is compared with the knock waveform model to calculate correlation coefficient K because a waveform shape is high in accuracy as compared with narrow first frequency band A and second frequency band B.

The composite waveform in first frequency band A and second frequency band B is used for calculating a knock magnitude N. As shown by oblique lines in FIG. 7, knock magnitude N is calculated with a value $\alpha$ obtained by summing (integrating) the reference magnitude for every crank angle of 90° and a portion (a sum of differences between integrated values and a reference magnitude) $\beta$ which is larger than the reference magnitude in a knock region (e.g., a region at the crank angle of 40°) defined while a crank angle CA(P) having a peak integrated value is set at a starting point.

That is, in the knock region where the magnitude of the vibration generated due to the knocking is relatively large, knock magnitude N is calculated using portion $\beta$ which is larger than the reference magnitude. In a region where the magnitude of the vibration generated due to the knocking is smaller than that in the knock region (where the vibration attenuates) (a region other than the knock region), knock magnitude N is calculated without using the portion larger than the reference magnitude. It is to be noted that a method for calculating knock magnitude N is described later.

Figure 8:
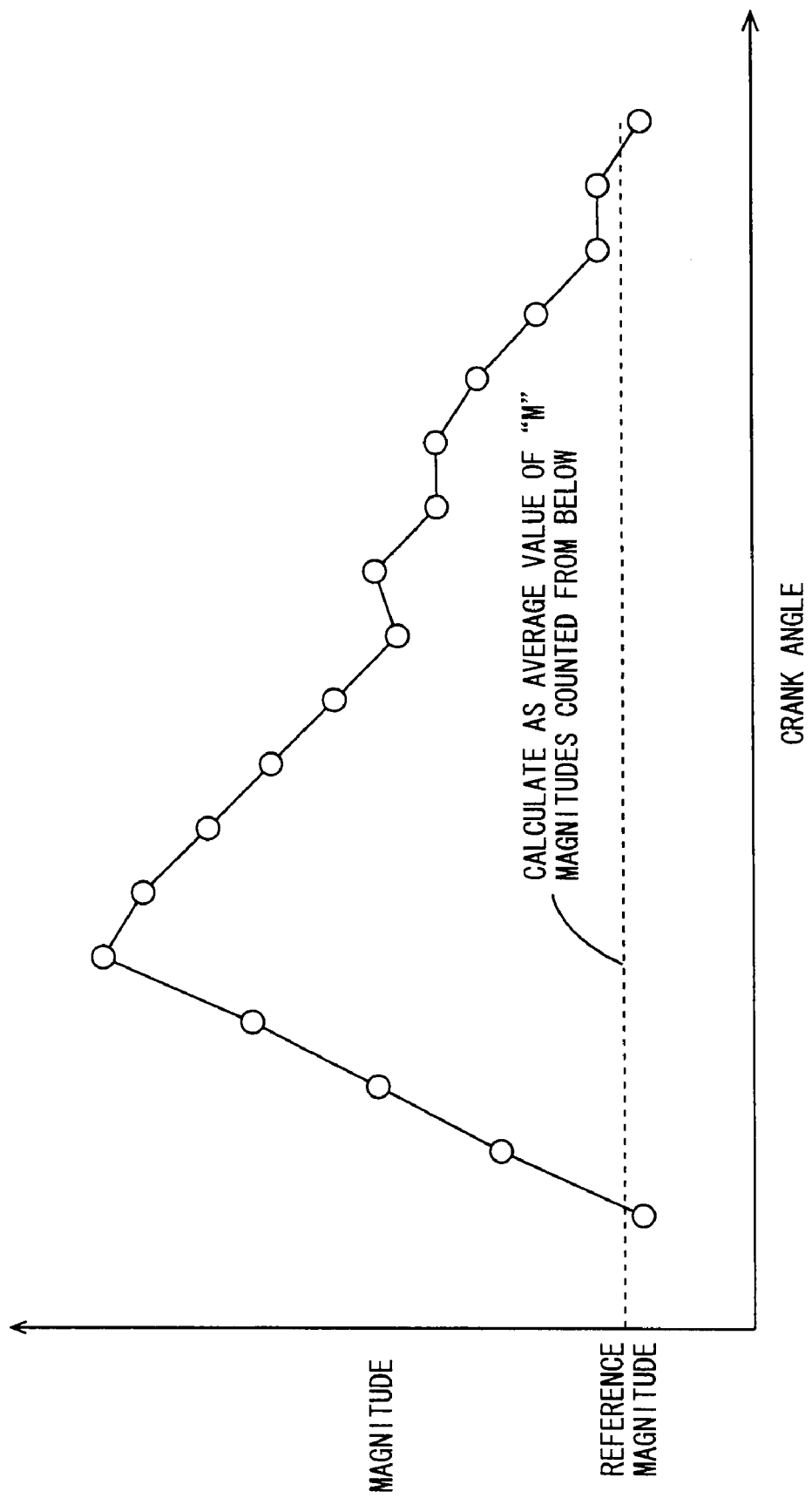
FIG. 8 is a chart showing a reference magnitude calculated using an integrated value in the vibration waveform in third frequency band C.

The reference magnitude is calculated using the integrated value in third frequency band C. As shown in FIG. 8, the reference magnitude is calculated as an average value of M (M is a natural number smaller than the number of obtained integrated values, e.g., "3") integrated values selected from integrated values obtained as the integrated values in third frequency band C such that smaller integrated values are preferentially selected. It is to be noted that the method for calculating the reference magnitude is not limited thereto, and an Mth small integrated value may be used as the reference magnitude.

The vibration waveform (the integrated value) in fourth frequency band D is used for tentative determination of knocking (to be described later). When it is tentatively determined that knocking occurs, engine ECU 200 compares calculated knock magnitude N with determination value V(KX) stored in SRAM 204, and determines whether or not knocking occurs at engine 100, for every ignition cycle.

Figure 9:
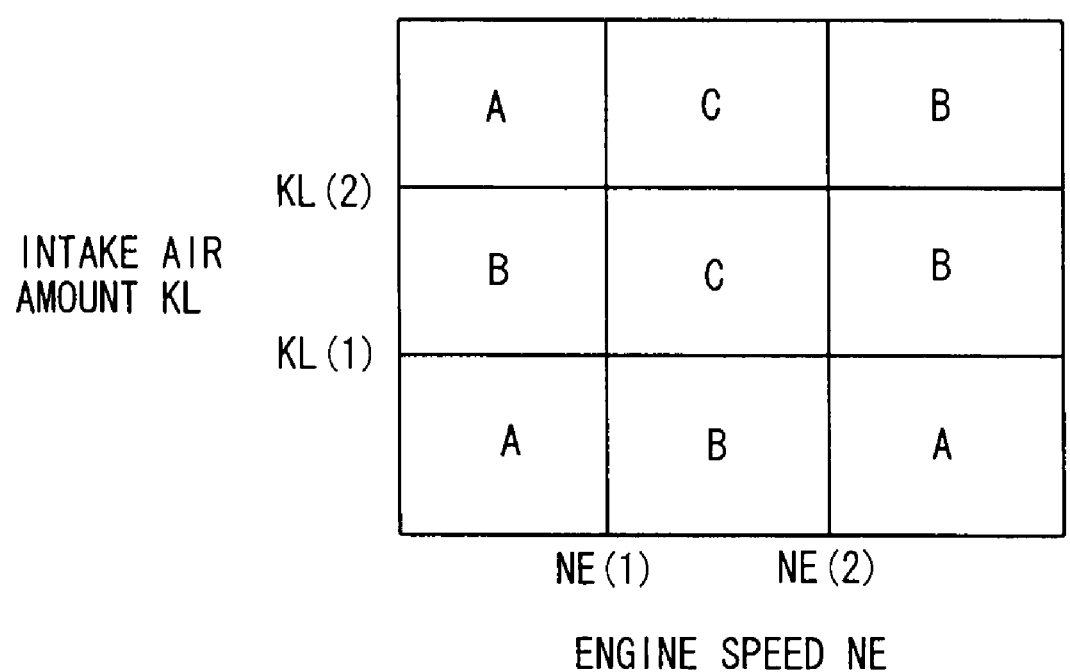
FIG. 9 is a chart showing a map of a determination value V(KX) stored in the ROM or a SRAM of the engine ECU.

As shown in FIG. 9, determination value V(KX) is stored as a map for every region divided based on an operation state that an engine speed NE and an intake air amount KL are used as parameters. In the present embodiment, nine regions, that is, a low rotation region (NE<NE(1)), a middle rotation region (NE(1)≦NE<NE(2)), a high rotation region (NE(2)≦NE), a low load region (KL<KL(1)), a middle load region (KL(1)≦KL<KL(2)) and a high load region (KL(2)≦KL) are provided to each cylinder. It is to be noted that the number of regions is not limited thereto. Alternatively, the region may be divided using parameters other than engine speed NE and intake air amount KL.

In shipment of engine 100 or the vehicle, determination value V(KX) (an initial value of determination value V(KX) in shipment) stored in ROM 202 is a value defined in advance by experiment and the like. However, even in a case where the same vibration is generated in engine 100 due to variation in output values from knock sensor 300 or deterioration, a magnitude to be detected may vary. In this case, determination value V(KX) must be corrected so that it is determined whether or not knocking occurs, using determination value V(KX) according to a magnitude detected in actual.

Therefore, in the present embodiment, a knock determination level V(KD) is calculated based on frequency distribution indicating a relationship between a magnitude value LOG(V) which is a value obtained by logarithmically converting a magnitude V and a frequency (the number of times, a probability) of detection of each magnitude value LOG(V).

Magnitude value LOG(V) is calculated for every region where engine speed NE and intake air amount KL are used as parameters. Magnitude V used for calculating magnitude value LOG(V) is a peak value (a peak value of integrated values at every 5°) of a magnitude between predetermined crank angles. A median value V(50) at which the accumulative sum of frequencies of magnitude values LOG(V) from the minimum value reaches 50% is calculated based on calculated magnitude LOG(V). Furthermore, standard deviations σ at magnitude values LOG(V) equal to or less than median value V(50) are calculated. In the present embodiment, for example, median value V(50) and standard deviation σ each approximated to a median value and a standard deviation calculated based on a plurality (e.g., 200 cycles) of magnitude values LOG(V) are calculated at every ignition cycle by the following calculation method.

If a magnitude value LOG(V) detected at this time is larger than a median value V(50) calculated at the previous time, a value obtained by adding a predetermined value C(1) to median value V(50) calculated at the previous time is calculated as a median value V(50) at this time. Conversely, if magnitude value LOG(V) detected at this time is smaller than median value V(50) calculated at the previous time, a value obtained by subtracting a predetermined value C(2) (e.g., C(2) is equal to C(1)) from median value V(50) calculated at the previous time is calculated as median value V(50) at this time.

If magnitude value LOG(V) detected at this time is smaller than median value V(50) calculated at the previous time and is larger than the value obtained by subtracting standard deviation σ calculated at the previous time from median value V(50) calculated at the previous time, a value obtained by subtracting a value obtained by doubling a predetermined value C(3) from standard deviation σ calculated at the previous time is calculated as a standard deviation σ at this time. Conversely, if magnitude value LOG(V) detected at this time is larger than median value V(50) calculated at the previous time or is smaller than the value obtained by subtracting standard deviation σ calculated at the previous time from median value V(50) calculated at the previous time, a value obtained by adding a predetermined value C(4) (e.g., C(4) is equal to C(3)) to standard deviation σ calculated at the previous time is calculated as standard deviation σ at this time. It is to be noted that the methods for calculating median value V(50) and standard deviation σ are not limited thereto. Alternatively, the initial values of median value V(50) and standard deviation σ may be a preset value or zero.

Figure 10:
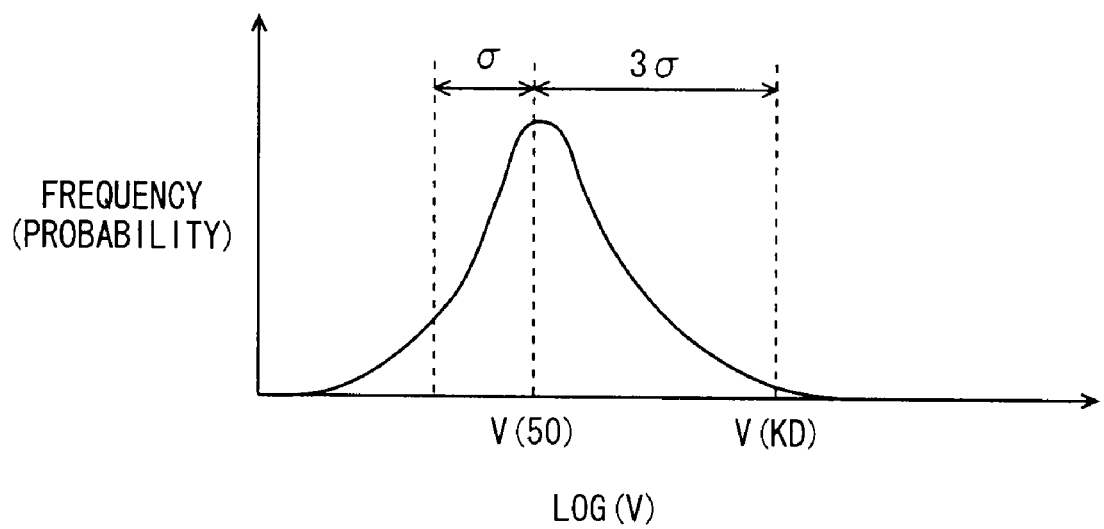
FIG. 10 is a chart (No. 1) showing frequency distribution of magnitude values LOG(V).

A knock determination level V(KD) is calculated using median value V(50) and standard deviation σ. As shown in FIG. 10, a value obtained by adding a product of a coefficient U(1) (U(1) is a constant, e.g., U(1)=3) and standard deviation σ to median value V(50) corresponds to knock determination level V(KD). It is to be noted that the method for calculating knock determination level V(KD) is not limited thereto.

A rate (frequency) of magnitude values LOG(V) larger than knock determination level V(KD) is determined as a frequency of occurrence of knocking, and is counted as a knock occupation rate KC. If knock occupation rate KC is larger than a threshold value KC(0), determination value V(KX) is corrected smaller by a predetermined correction amount such that a frequency of retarding an ignition timing becomes high. If knock occupation rate KC is smaller than threshold value KC(0), determination value V(KX) is corrected larger by a predetermined correction amount such that a frequency of advancing the ignition timing becomes high determination value V(KX) corrected as described above is stored in SRAM 204.

Coefficient U(1) is a coefficient found from data or expertise obtained by experiment and the like. A magnitude value LOG(V), which is larger than knock determination level V(KD) in a case of U(1)=3, is substantially equal to a magnitude value LOG(V) in an ignition cycle at which knocking occurs actually. It is to be noted that coefficient U(1) may be a value other than "3".

Figure 11:
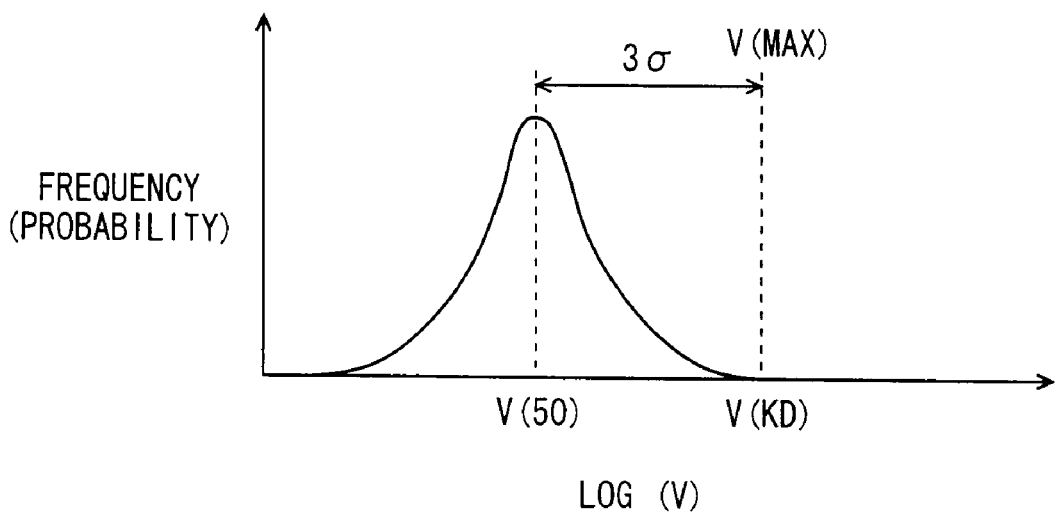
FIG. 11 is a chart (No. 2) showing frequency distribution of magnitude values LOG(V).
Figure 12:
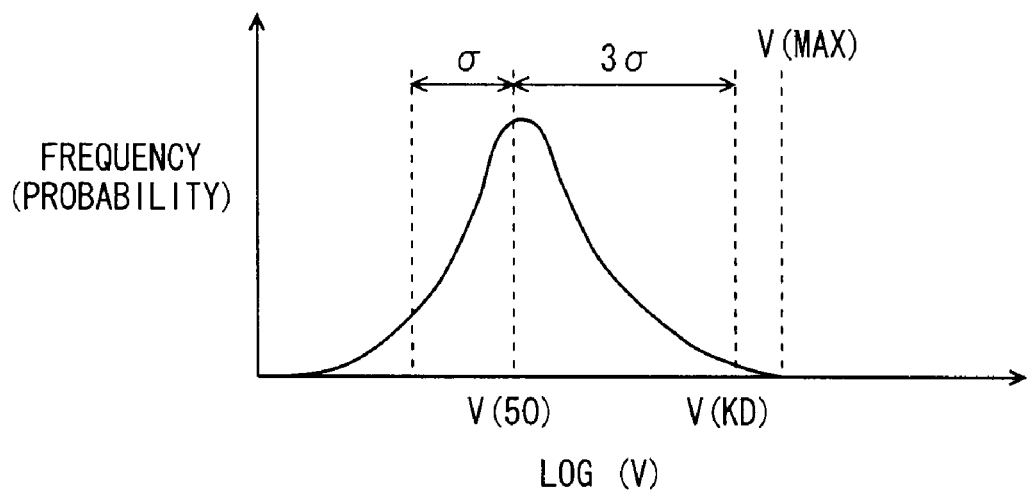
FIG. 12 is a chart (No. 3) showing frequency distribution of magnitude values LOG(V).

Frequency distribution of magnitude values LOG(V) becomes normal distribution shown in FIG. 11 unless knocking occurs at engine 100, and a maximum value V(MAX) of magnitude values LOG(V) becomes equal to knock determination level V(KD). On the other hand, if knocking occurs, magnitude V to be detected becomes large. When a larger magnitude value LOG(V) is calculated, as shown in FIG. 12, maximum value V(MAX) becomes larger than knock determination level V(KD).

Figure 13:
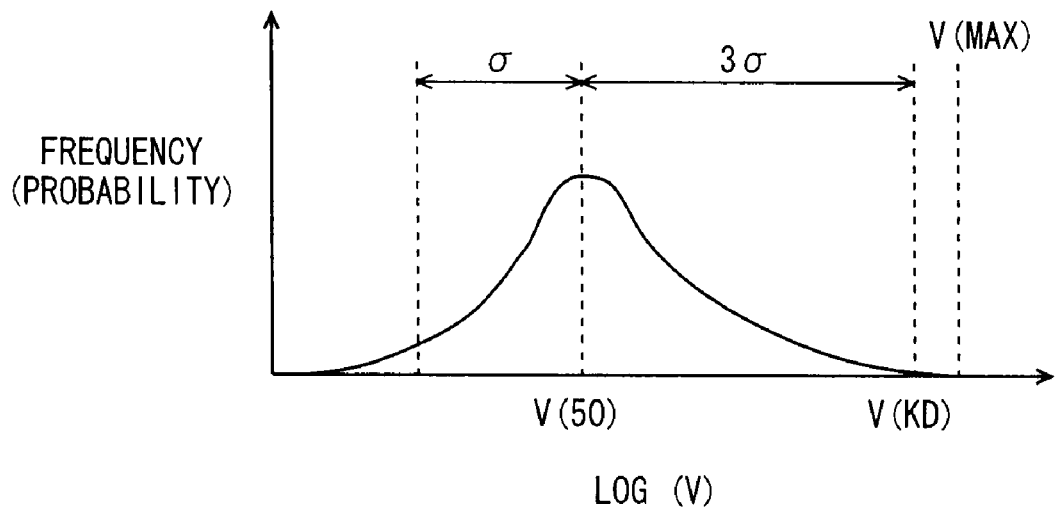
FIG. 13 is a chart (No. 4) showing frequency distribution of magnitude values LOG(V).

When the frequency of occurring knocking becomes higher, maximum value V(MAX) becomes larger as shown in FIG. 13. Here, median value V(50) and standard deviation σ in the frequency distribution become larger together with maximum value V(MAX). Therefore, knock determination level (KD) becomes large.

A magnitude value LOG(V), which is smaller than knock determination level V(KD), is not determined as magnitude value LOG(V) in a cycle that knocking occurs. Therefore, when knock determination level V(KD) is large, a frequency of determining that no knocking occurs becomes high even in a case where knocking occurs.

Figure 14:
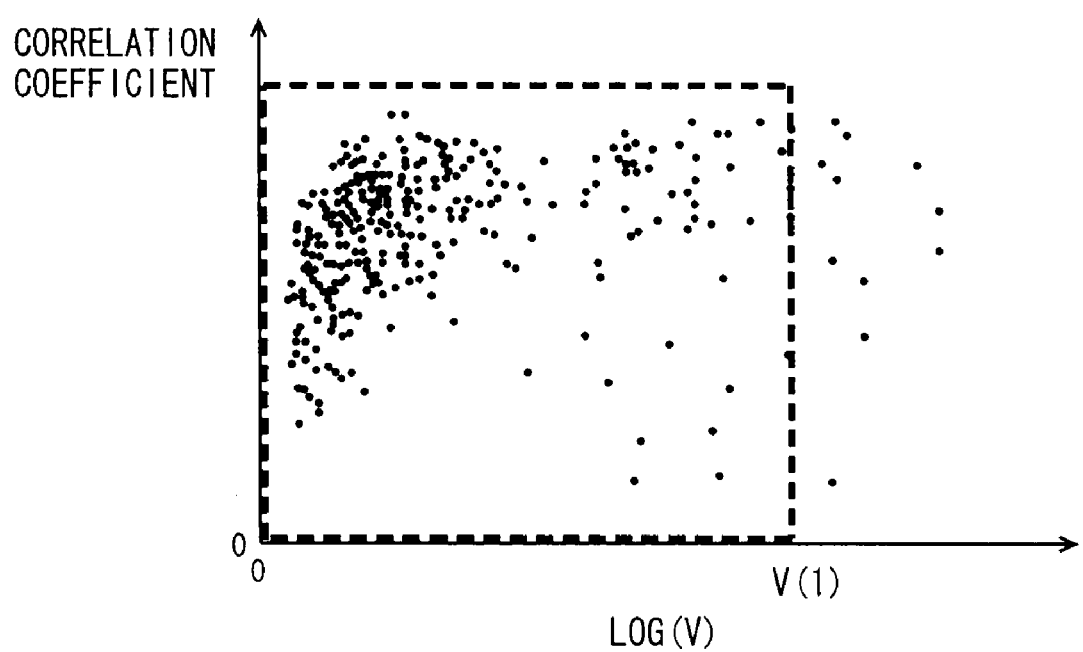
FIG. 14 is a chart showing magnitude values LOG(V) used for forming the frequency distribution of the magnitude values LOG(V).

In order to avoid this disadvantage, in the present embodiment, as shown in FIG. 14, magnitude values LOG(V) within a region surrounded by a broken line are used for calculating median value V(50) and standard deviation σ while excluding magnitude values LOG(V) larger than a threshold value V(1). FIG. 14 is a chart in which calculated magnitude values LOG(V) are plotted for every correlation coefficient K in a cycle that corresponding magnitude value LOG(V) is obtained.

Threshold value V(1) is a value obtained by adding a product of a standard deviation of magnitude values LOG(V), which are equal to or less than a median value, from each other and a coefficient U(2) (U(2) is a constant, e.g., U(2)=3) to a median value of the frequency distribution of magnitude values LOG(V).

Only magnitude values LOG(V), which are smaller than threshold value V(1), are extracted to calculate median value V(50) and standard deviation σ, so that median value V(50) and standard deviation σ become stable without being excessive. Thus, it is possible to prevent knock determination level V(KD) from being excessive. Therefore, it is possible to prevent the frequency of determining that no knocking occurs from becoming high even in a case where knocking occurs.

It is to be noted that the method for extracting magnitude values LOG(V) used for calculating median value V(50) and standard deviation σ is not limited thereto. For example, a magnitude value LOG(V), which is calculated at an ignition cycle that correlation coefficient K is larger than threshold value K(1), may be extracted from magnitude values LOG(V) smaller than threshold value V(1) described above.

Figure 15:
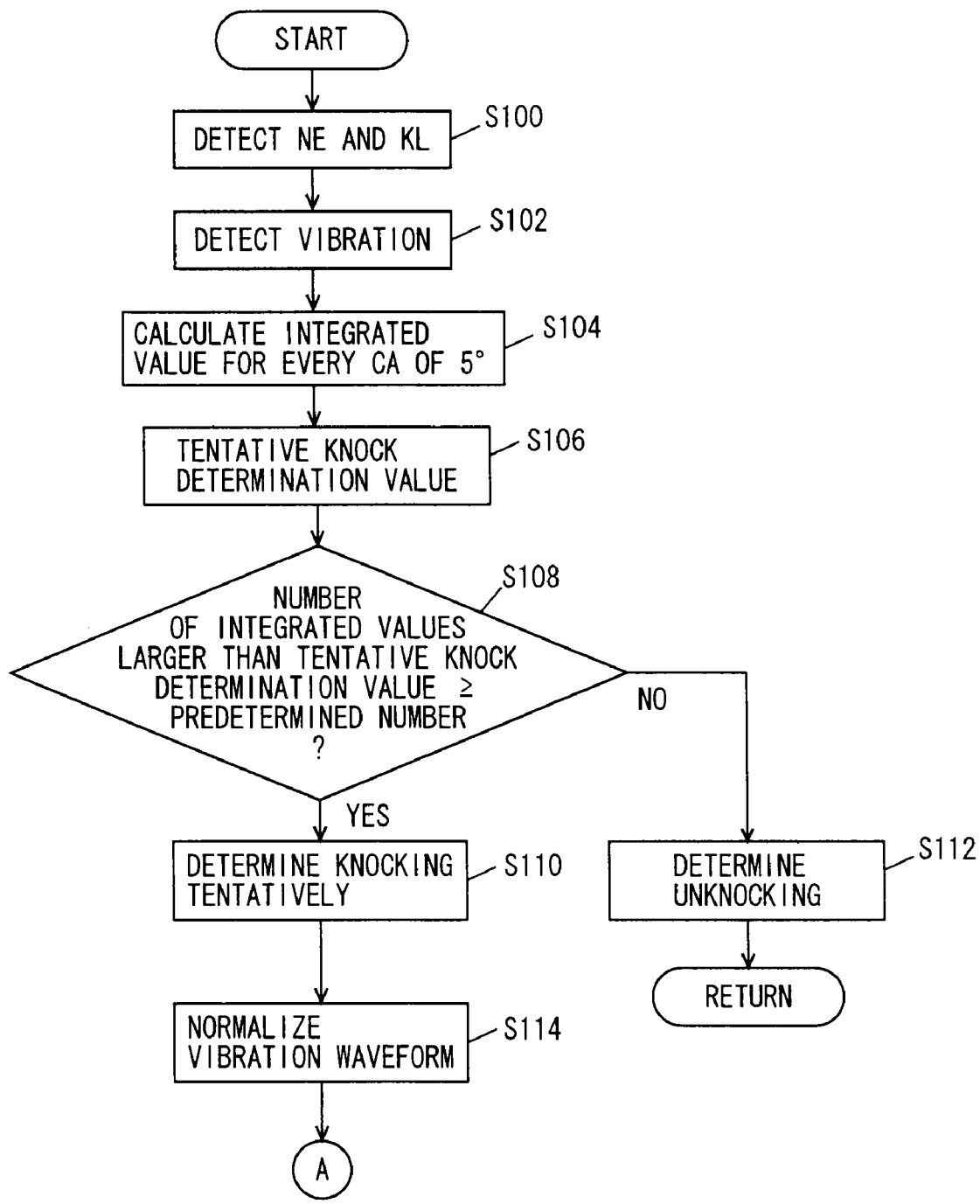
FIG. 15 is a flowchart (No. 1) showing a control structure of a program executed by the engine ECU which is the knocking determination apparatus according to the embodiment of the present invention.
Figure 16:
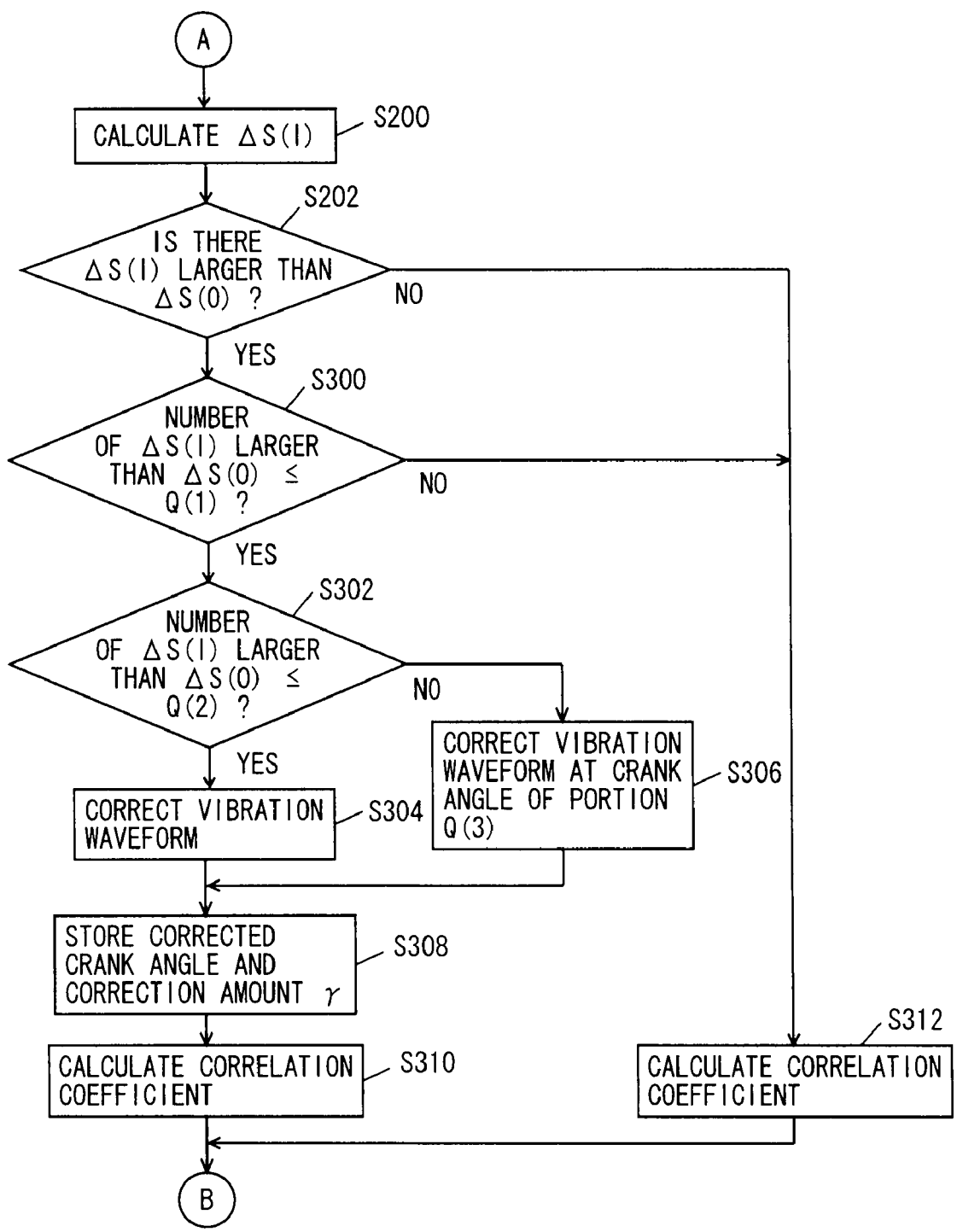
FIG. 16 is a flowchart (No. 2) showing a control structure of a program executed by the engine ECU which is the knocking determination apparatus according to the embodiment of the present invention.
Figure 17:
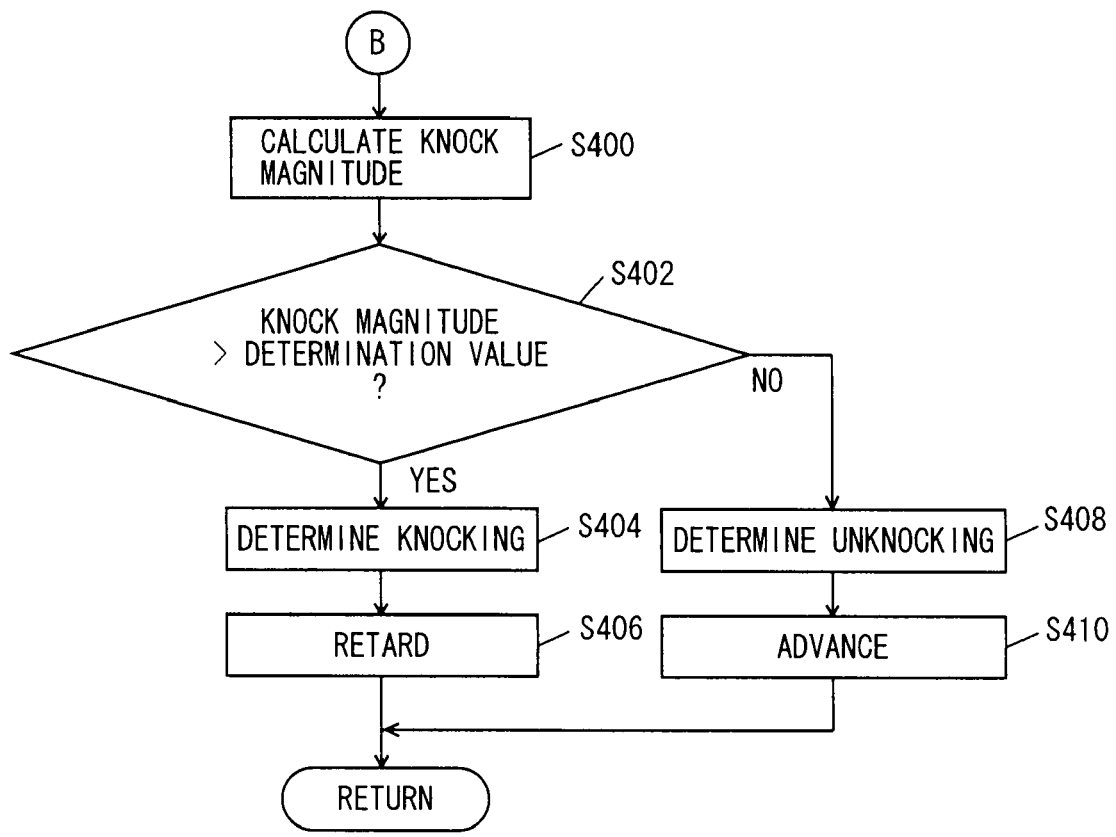
FIG. 17 is a flowchart (No. 3) showing a control structure of a program executed by the engine ECU which is the knocking determination apparatus according to the embodiment of the present invention.

With reference to FIGS. 15 to 17, description will be given of a control structure of a program to be executed by engine ECU 200 which is the knocking determination apparatus according to the present embodiment in order to make a determination about occurrence of knocking for every ignition cycle to control an ignition timing.

In step (hereinafter, the term "step" will be abbreviated as "S") 100, engine ECU 200 detects an engine speed NE, based on a signal sent from crank position sensor 306, and also detects an intake air amount KL, based on a signal sent from air flow meter 314.

In S102, engine ECU 200 detects a magnitude of a vibration in engine 100, based on a signal sent from knock sensor 300. The magnitude of the vibration is expressed as an output voltage value of knock sensor 300. Alternatively, the magnitude of the vibration may be expressed as a value corresponding to the output voltage value of knock sensor 300. The magnitude is detected in a range from a top dead center to 90° (a crank angle of 90°) in a combustion stroke.

In S104, engine ECU 200 calculates a value (an integrated value) obtained by integrating the output voltage value (the value indicating the magnitude of the vibration) of knock sensor 300 for every crank angle of 5° (by an angle of 5°). The integrated value is calculated for every vibrations in first to fourth frequency bands A to D. Herein, the integrated value in first frequency band A and the integrated value in second frequency band B are added to correspond to the crank angles. In other words, a vibration waveform in first frequency band A and a vibration waveform in second frequency band B are combined.

In S106, engine ECU 200 multiplies a minimum value of the integrated value in fourth frequency band D in the knock detection gate by a coefficient Y (Y is a positive value) to calculate a tentative knock determination value. In S108, engine ECU 200 determines whether or not the number of integrated values larger than the tentative knock determination value is equal to or more than a predetermined number among the integrated values in fourth frequency band D in the knock detection gate.

If the number of integrated values larger than the tentative knock determination value is equal to or more than the predetermined number among the integrated values in fourth frequency band D (YES in S108), the processing proceeds to S110. Otherwise (NO in S108), the processing proceeds to S112.

In S110, engine ECU 200 tentatively determines that knocking occurs. In S112, engine ECU 200 determines that no knocking occurs. Thereafter, the processing is completed.

In S114, engine ECU 200 normalizes the vibration waveforms in fourth frequency band D. Herein, "normalization" means that integrated values are divided by a peak value of the integrated value in a vibration waveform and a magnitude of a vibration is expressed as a dimensionless number in a range between 0 and 1.

In S200, engine ECU 200 calculates an absolute value ΔS(I) of a deviation between the normalized vibration waveform in fourth frequency band D and the knock waveform model for every crank angle.

In S202, engine ECU 200 determines whether or not there are absolute values ΔS(I) larger than a threshold value ΔS(0). If there are absolute values ΔS(I) larger than threshold value ΔS(0) (YES in S202), the processing proceeds to S300. Otherwise (NO in S202), the processing proceeds to S312.

In S300, engine ECU 200 determines whether or not the number of absolute values ΔS(I) larger than threshold value ΔS(0) is equal to or less than a predetermined number Q(1). If the number of absolute values ΔS(I) larger than threshold value ΔS(0) is equal to or less than predetermined number Q(1) (YES in S300), the processing proceeds to S302. Otherwise (NO in S300), the processing proceeds to S312.

In S302, engine ECU 200 determines whether or not the number of absolute values ΔS(I) larger than threshold value ΔS(0) is equal to or less than a predetermined number Q(2). If the number of absolute values ΔS(I) larger than threshold value ΔS(0) is equal to or less than predetermined number Q(2) (YES in S302), the processing proceeds to S304. Otherwise (NO in S302), the processing proceeds to S306.

In S304, engine ECU 200 corrects the normalized vibration waveform such that the magnitude becomes equal to the magnitude of the knock waveform model (such that absolute value ΔS(I) is decremented so as to become zero) at the crank angle that absolute value ΔS(I) is larger than threshold value ΔS(0).

In S306, engine ECU 200 corrects the normalized vibration waveform at the crank angle of a portion Q(3) (Q(3)<Q(1)) such that the magnitude becomes equal to the magnitude of the knock waveform model (such that absolute value ΔS(I) is decremented so as to become zero) in such a manner that a crank angle having a larger absolute value ΔS(I) is preferentially used among the crank angles that absolute value ΔS(I) is larger than threshold value ΔS(0).

In S308, engine ECU 200 stores the crank angle subjected to the correction and a correction amount (a product of absolute value ΔS(I) and the peak value of the integrated values) γ in SRAM 204.

In S310, engine ECU 200 compares the corrected vibration waveform with the knock waveform model to calculate a correlation coefficient K which is a value concerning the deviation between the corrected vibration waveform and the knock waveform model.

In S312, engine ECU 200 compares the normalized vibration waveform (the vibration waveform subjected to no correction) with the knock waveform model to calculate a correlation coefficient K which is a value concerning the deviation between the normalized vibration waveform and the knock waveform model.

In S400, engine ECU 200 calculates a knock magnitude N. Knock magnitude N is calculated using the composite waveform in first frequency band A and second frequency band B.

Figure 7:
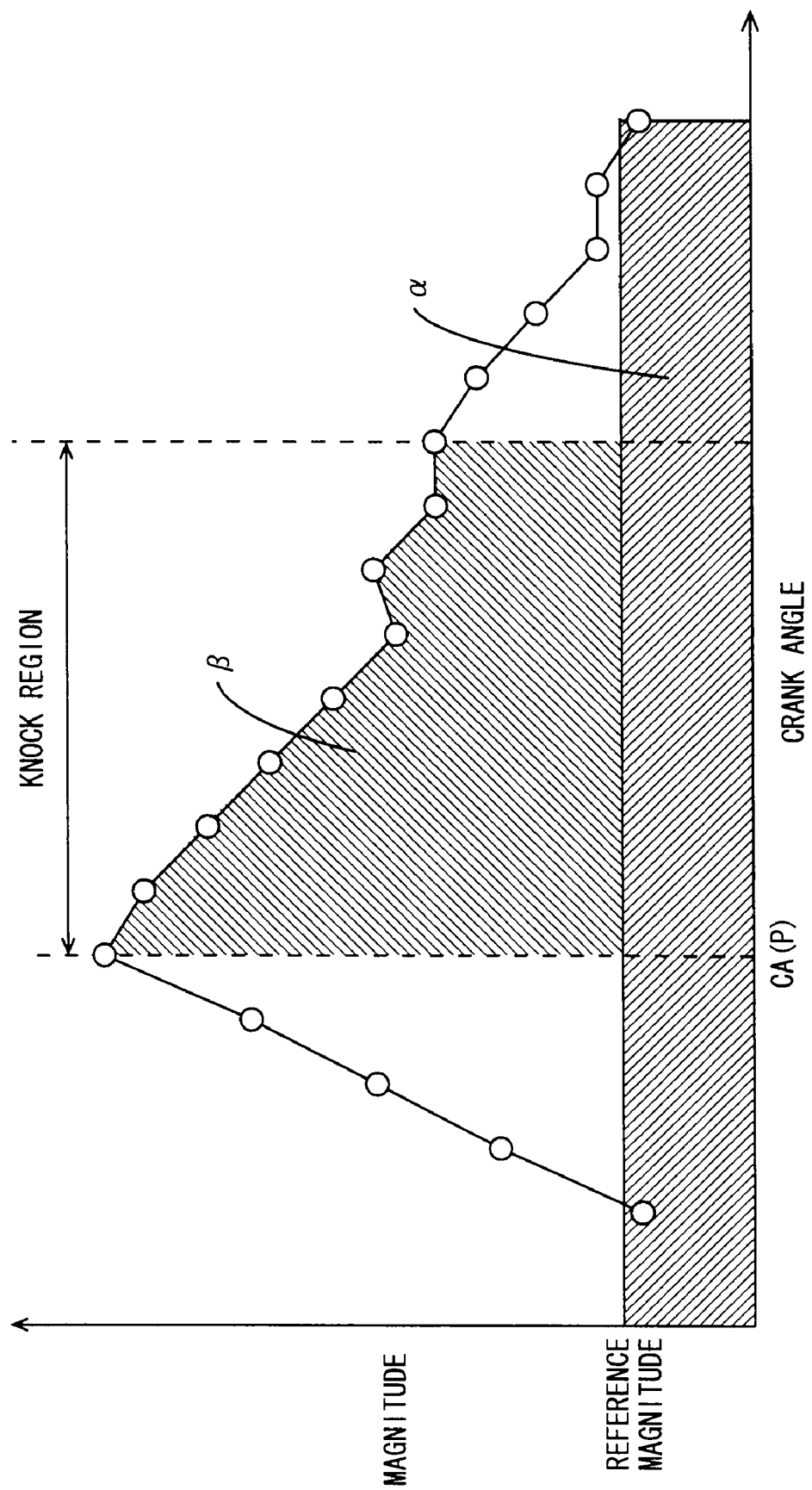
FIG. 7 is a chart (No. 1) showing a composite waveform in a first frequency band A and a second frequency band B, which is used for calculating a knock magnitude N.

As shown by the oblique lines in FIG. 7, knock magnitude N is calculated from an equation:

$$N=(\alpha+(\beta-\gamma)\times K)/\alpha \quad (1)$$

where α represents a value obtained by summing (integrating) the reference magnitude for every crank angle of 90° (in the knock detection gate), β represents a portion which is larger than the reference magnitude in a knock region determined while a crank angle CA(P) having a peak integrated value is set at a starting point, γ represents the correction amount of the vibration waveform, and K represents the correlation coefficient. Herein, if the vibration waveform is subjected to no correction, knock magnitude N is calculated with γ being set at zero.

In S402, engine ECU 200 determines whether or not knock magnitude N is larger than a determination value V(KX). If knock magnitude N is larger than determination value V(KX) (YES in S402), the processing proceeds to S404. Otherwise (NO in S402), the processing proceeds to S408.

In S404, engine ECU 200 determines that knocking occurs at engine 100. In S406, engine ECU 200 retards an ignition timing.

In S408, engine ECU 200 determines that no knocking occurs at engine 100. In S410, engine ECU 200 advances the ignition timing.

Next, description will be given of the operations of engine ECU 200 which is the knocking determination apparatus according to the present embodiment, based on the structure and the flowchart each described above. It is assumed in the following description that predetermined number Q(1) is "3", predetermined number Q(2) is "2" and predetermined number Q(3) is "1".

During operation of engine 100, engine ECU 200 detects engine speed NE, based on the signal sent from crank position sensor 306, and also detects intake air amount KL, based on the signal sent from air flow meter 314 (S100). Moreover, engine ECU 200 detects the magnitude of the vibration in engine 100, based on the signal sent from knock sensor 300 (S102).

In the range from the top dead center to 90° in the combustion stroke, engine ECU 200 calculates the integrated values for every 5° for every vibrations in first frequency band A to fourth frequency band D (S104). Further, engine ECU 200 adds the integrated values in first frequency band A to those in second frequency band B to correspond to the crank angles, and combines the vibration waveforms. Herein, engine ECU 200 compares the vibration waveform in third frequency band C with the knock waveform model to calculate correlation coefficient K, and uses correlation coefficient K in order to determine occurrence of knocking for every ignition.

Typically, a magnitude of a vibration generated due to noise attenuates rapidly as its characteristic. On the other hand, a magnitude of a vibration generated due to knocking attenuates gently as its characteristic. With the characteristics described above, normally, it is possible to distinguish a vibration generated due to noise from a vibration generated due to knocking, based on a waveform.

Figure 18:
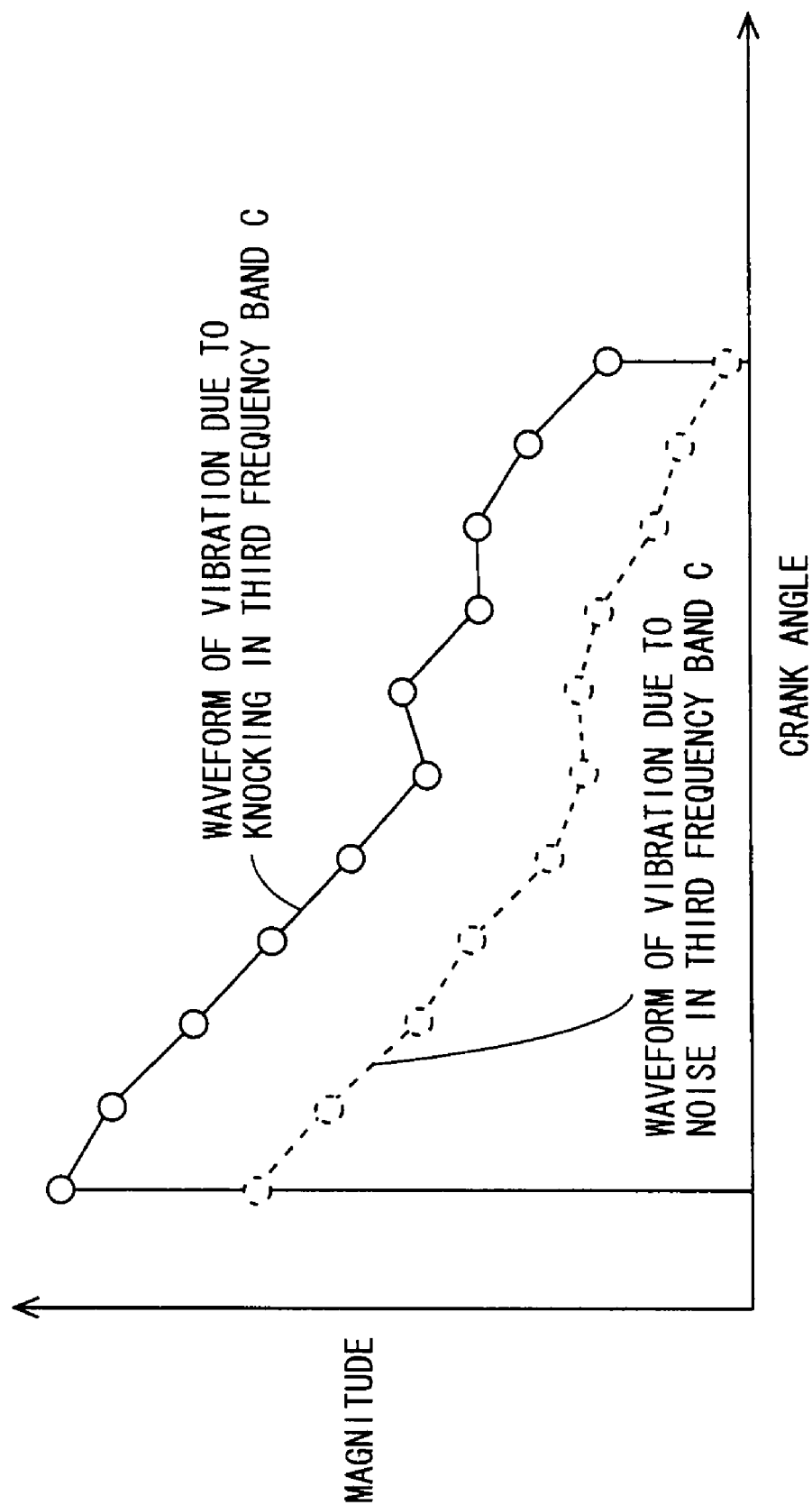
FIG. 18 is a chart showing the vibration waveform in third frequency band C.

As shown in FIG. 18, however, the vibration in third frequency band C is low in magnitude, but has a waveform similar in shape to a waveform in knocking although it is generated due to noise in some instances. In such a case, it is difficult to distinguish the vibration generated due to the knocking from the vibration generated due to the noise, based on the shape of the waveform.

Figure 19:
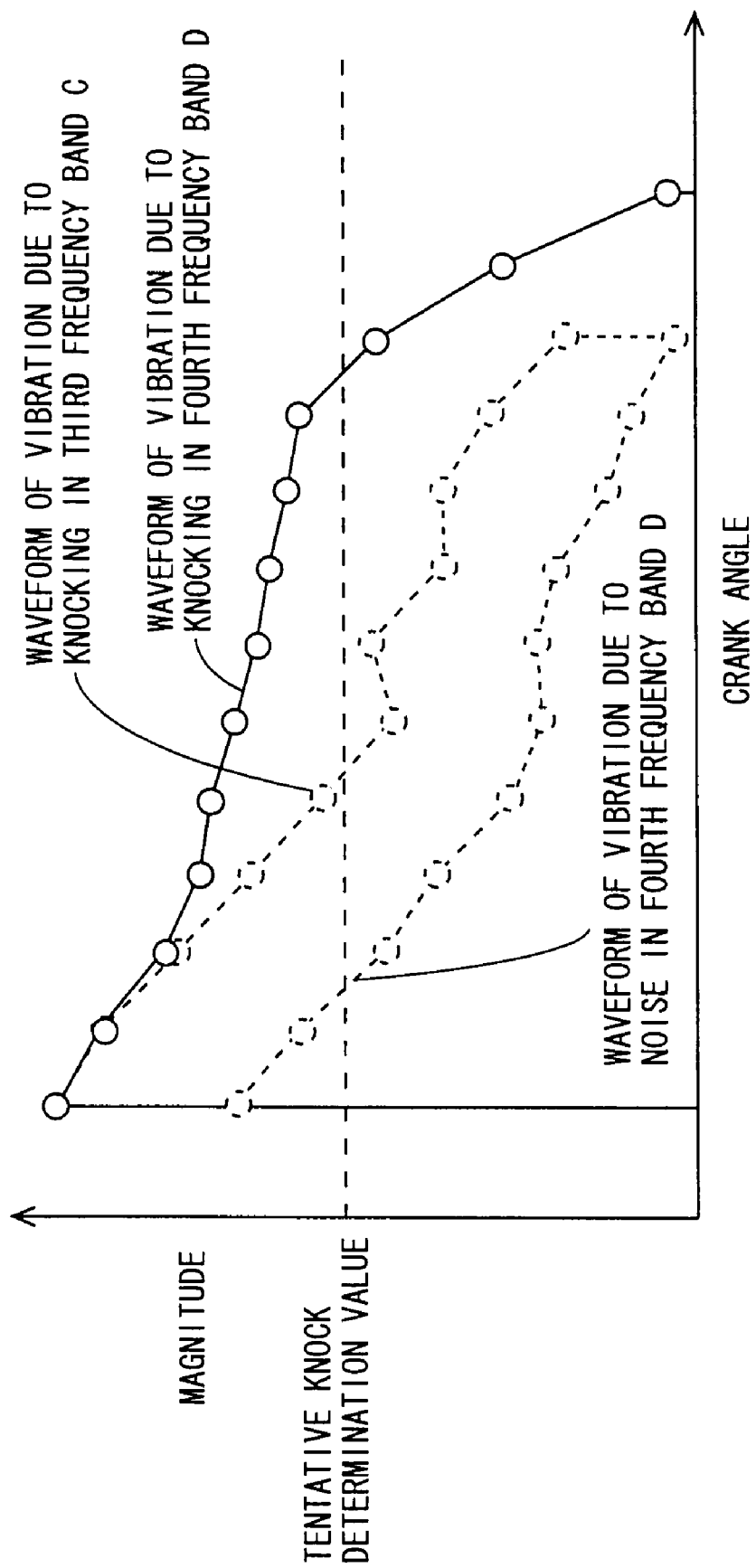
FIG. 19 is a chart showing a vibration waveform in a fourth frequency band D.

As described above, when knocking occurs at engine 100, a vibration is generated at the resonant frequency of engine 100 itself. As shown in FIG. 19, accordingly, the vibration in wide fourth frequency band D including the resonant frequency of engine 100 itself is sustained upon occurrence of the knocking.

Among vibrations generated due to noise, on the other hand, a vibration which is relatively low in magnitude does not appear at the resonant frequency of engine 100 itself. Among the vibrations in wide fourth frequency band D including the resonant frequency of engine 100 itself, accordingly, the vibrations which are generated due to the noise and are relatively low in magnitude attenuate rapidly without being sustained.

Therefore, it is possible to readily distinguish the vibration generated due to the knocking from the vibration generated due to the noise. With the characteristics described above, occurrence of knocking is determined tentatively based on the integrated value (magnitude) of the vibrations in wide fourth frequency band D including the resonant frequency of engine 100 itself.

In order to tentatively determine occurrence of knocking, engine ECU 200 multiplies the minimum value of the integrated values in fourth frequency band D by coefficient Y (Y is a positive value) to calculate the tentative knock determination value (S106). Thus, it is possible to obtain a tentative knock determination value based on a vibration which is generated due to a factor other than knocking or noise, that is, a mechanical vibration of engine 100 itself. Therefore, it is possible to obtain an appropriate tentative knock determination value for every engine 100.

In the case where the number of integrated values, which are larger than the tentative knock determination value, among the integrated values in fourth frequency band D is equal to or more than the predetermined number (YES in S108), there is a high possibility that knocking occurs. Therefore, engine ECU 200 tentatively determines that knocking occurs (S110).

In the case where the number of integrated values, which are larger than the tentative knock determination value, among the integrated values in fourth frequency band D is smaller than the predetermined number (NO in step S108), on the other hand, there is a considerably low possibility that knocking occurs. Therefore, engine ECU 200 determines that no knocking occurs (S112).

If engine ECU 200 tentatively determines that knocking occurs, then, engine ECU 200 makes a more specific determination, based on the vibration waveform in third frequency band C. For this purpose, engine ECU 200 normalizes the vibration waveform in third frequency band C (S114).

By the normalization, the magnitude of the vibration in the vibration waveform is expressed as a dimensionless number in a range between 0 and 1. Thus, engine ECU 200 allows the comparison between the detected vibration waveform and the knock waveform model irrespective of the magnitude of the vibration. Therefore, a plurality of knock waveform models are not necessarily stored in correspondence with the magnitudes of the vibrations, which allows easy formation of the knock waveform model.

Engine ECU 200 brings the timing at which the magnitude of the vibration in the normalized vibration waveform becomes maximum into coincide with the timing at which the magnitude of the vibration in the knock waveform model becomes maximum (see FIG. 6). In this state, engine ECU 200 calculates absolute value ΔS(I) of the deviation between the normalized vibration waveform and the knock waveform model for every crank angle (S200).

Figure 20:
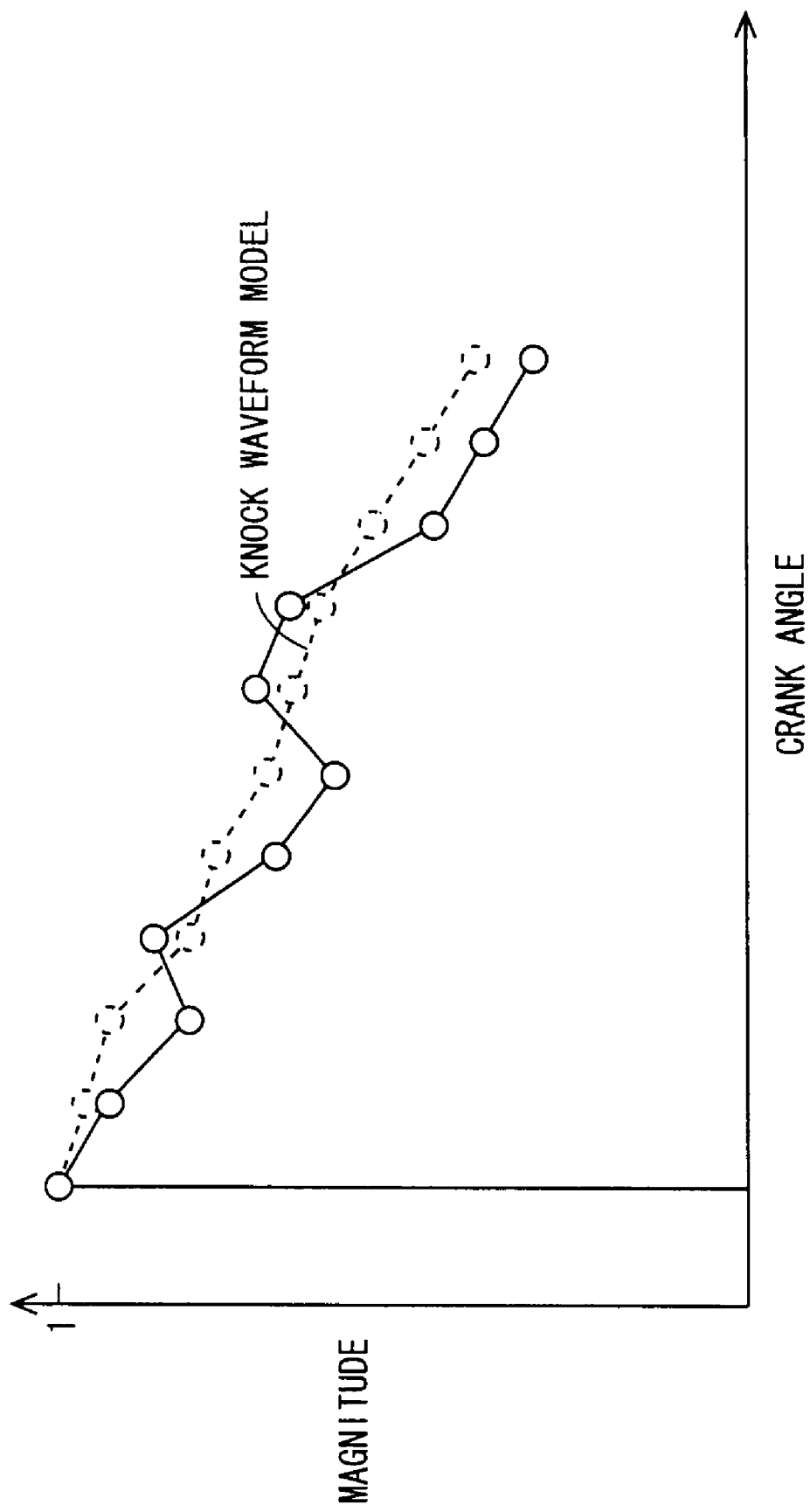
FIG. 20 is a chart (No. 2) for comparing the vibration waveform in third frequency band C and the knock waveform model.

As shown in FIG. 20, herein, in the case where there is no absolute value ΔS(I) larger than threshold value ΔS(0) as a result of the fact that the resultant vibration waveform is approximate to the knock waveform model (NO in S202), it is considered that the resultant vibration waveform includes no vibrations due to noise other than knocking (vibrations generated by operations of intake valve 116, exhaust valve 118, injector 104 (particularly, a direct injection-type injector that directly injects fuel into the cylinder), pump 120 (particularly, a high-pressure pump that supplies fuel to the direct injection-type injector) and the like).

In this case, engine ECU 200 calculates correlation coefficient K from the equation, K=(S−ΣΔS(I))/S, based on sum ΣΔS(I) of calculated absolute values ΔS(I) and value S obtained by integrating the magnitude of the vibration by the crank angle in the knock waveform model (S312).

Thus, engine ECU 200 can convert the degree of match between the detected vibration waveform and the knock waveform model into a numeric value so as to make an objective determination. Moreover, by the comparison between the vibration waveform and the knock waveform model, it is possible to analyze whether or not a vibration is generated due to knocking, based on a behavior of the vibration such as attenuation tendency of the vibration.

As described above, there has been known that the vibration generated due to the noise, that is, the vibration generated due to the operations of intake valve 116, exhaust valve 118, injector 104, pump 120 or the like is large in magnitude, but attenuates quickly as compared with a vibration generated due to knocking, as its characteristic. In other words, a vibration generated due to noise is shorter in generation period than a vibration generated due to knocking.

Figure 21:
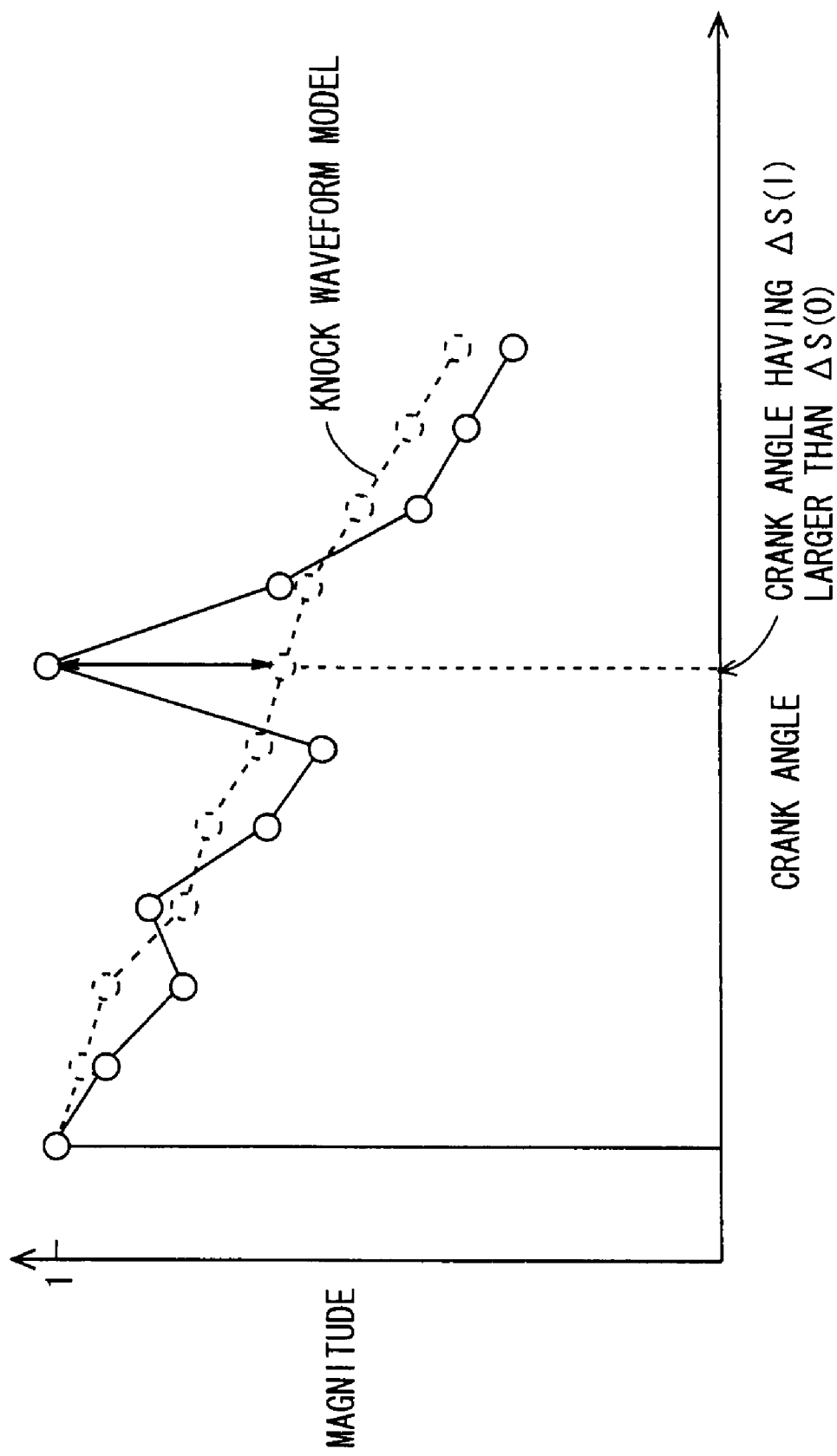
FIG. 21 is a chart (No. 3) for comparing the vibration waveform in third frequency band C and the knock waveform model.

As shown in FIG. 21, accordingly, in the case where there are absolute values ΔS(I) larger than threshold value ΔS(0) (YES in S202) and the number of absolute values ΔS(I) is equal to or less than "3" (YES in S300) although the resultant vibration waveform is approximate to the knock waveform model, there is a possibility that the resultant vibration waveform includes a vibration generated due to noise.

Particularly, in the case where the number of absolute values ΔS(I) which are larger than threshold value ΔS(0) is equal to or less than "2" (YES in S302), there is a possibility that the resultant vibration waveform includes a vibration generated due to noise.

In this case, even when the resultant vibration waveform is compared with the knock waveform model as it is, there are absolute values ΔS(I) larger than threshold value ΔS(0). Therefore, there is a possibility of error determination that no knocking occurs although knocking occurs.

Figure 22:
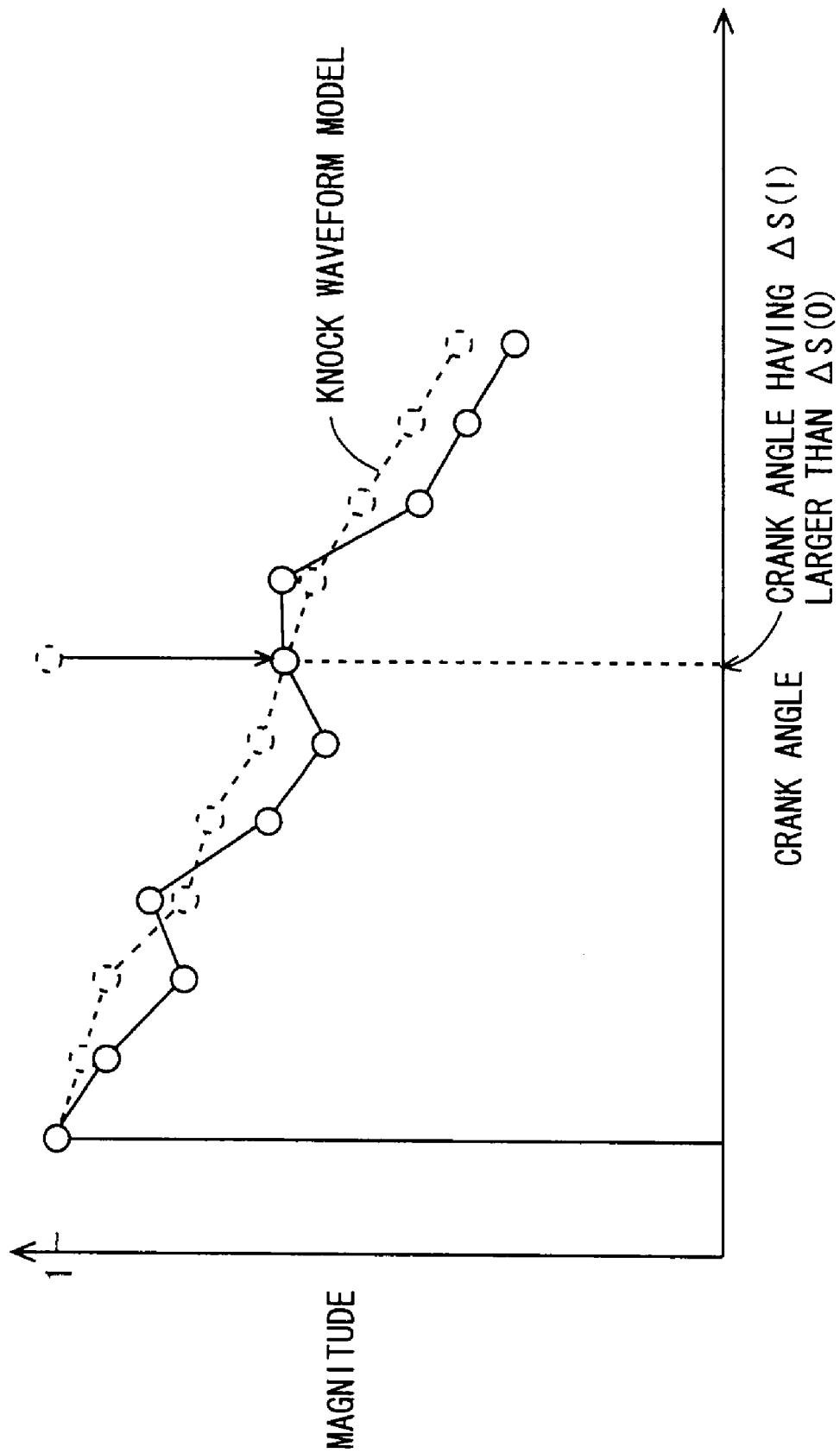
FIG. 22 is a chart (No. 4) for comparing the vibration waveform in third frequency band C and the knock waveform model.

As shown in FIG. 22, in order to avoid this disadvantage, engine ECU 200 corrects the vibration waveform at the crank angle having absolute value ΔS(I) larger than threshold value ΔS(0) such that the magnitude becomes equal to the magnitude of the knock waveform model (S304).

Thus, engine ECU 200 can reduce an influence of a vibration generated due to noise included in the vibration waveform. Therefore, engine ECU 200 can reduce the error determination that no knocking occurs although knocking occurs.

Figure 23:
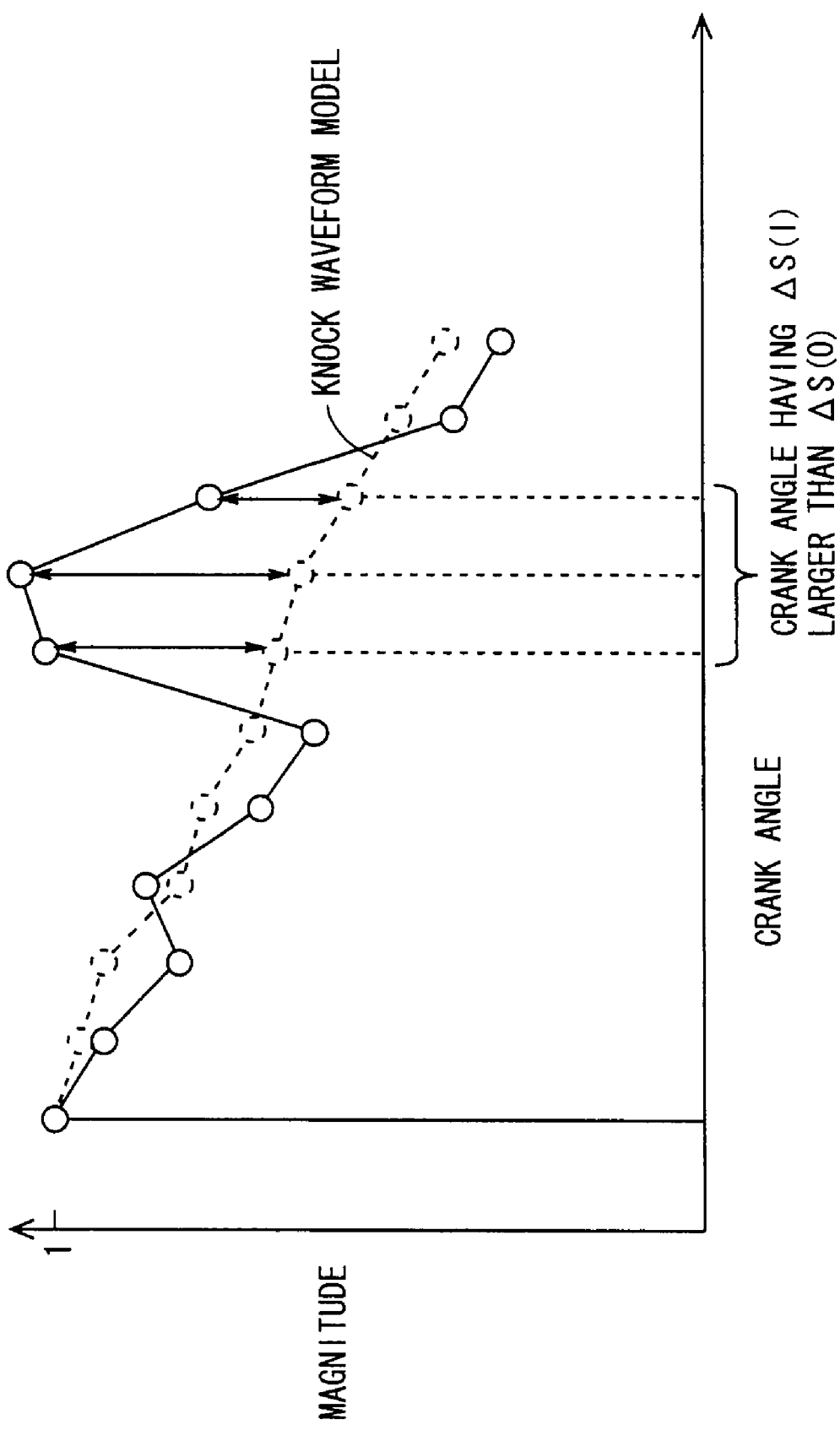
FIG. 23 is a chart (No. 5) for comparing the vibration waveform in third frequency band C and the knock waveform model.

As shown in FIG. 23, on the other hand, in the case where the number of absolute values ΔS(I) larger than threshold value ΔS(0) is equal to or less than "3" (YES in S300), but is larger than "2" (NO in S302), there is a possibility that the resultant vibration waveform includes a vibration generated due to noise or a possibility that the resultant vibration waveform includes no vibration generated due to noise.

Figure 24:
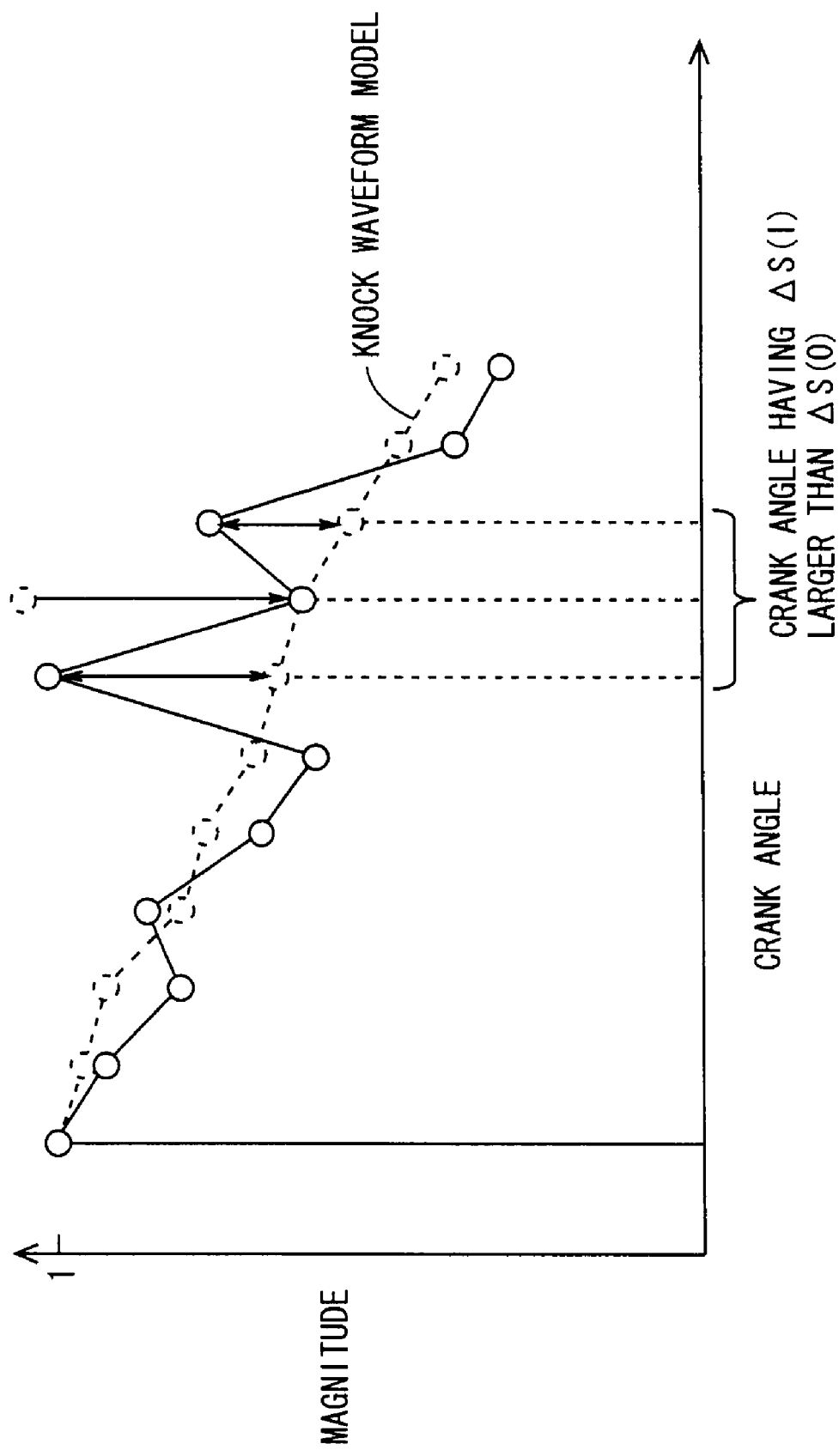
FIG. 24 is a chart (No. 6) for comparing the vibration waveform in third frequency band C and the knock waveform model.

If the vibration waveform is corrected in this case, there is a possibility of error determination that knocking occurs although no knocking occurs. As shown in FIG. 24, therefore, engine ECU 200 corrects the vibration waveform at the crank angle of a portion "1" such that the magnitude becomes equal to the magnitude of the knock waveform model in such a manner that a crank angle having a larger absolute value ΔS(I) is preferentially used among the crank angles that absolute value ΔS(I) is larger than threshold value ΔS(0) (S306). Thus, engine ECU 200 can prevent the vibration waveform from being corrected more than necessary. Therefore, engine ECU 200 can reduce error determination that knocking occurs although no knocking occurs.

Engine ECU 200 stores the crank angle subjected to the correction and correction amount γ thereof in SRAM 204 (S308). Engine ECU 200 compares the corrected vibration waveform with the knock waveform model to calculate correlation coefficient K (S310).

Figure 25:
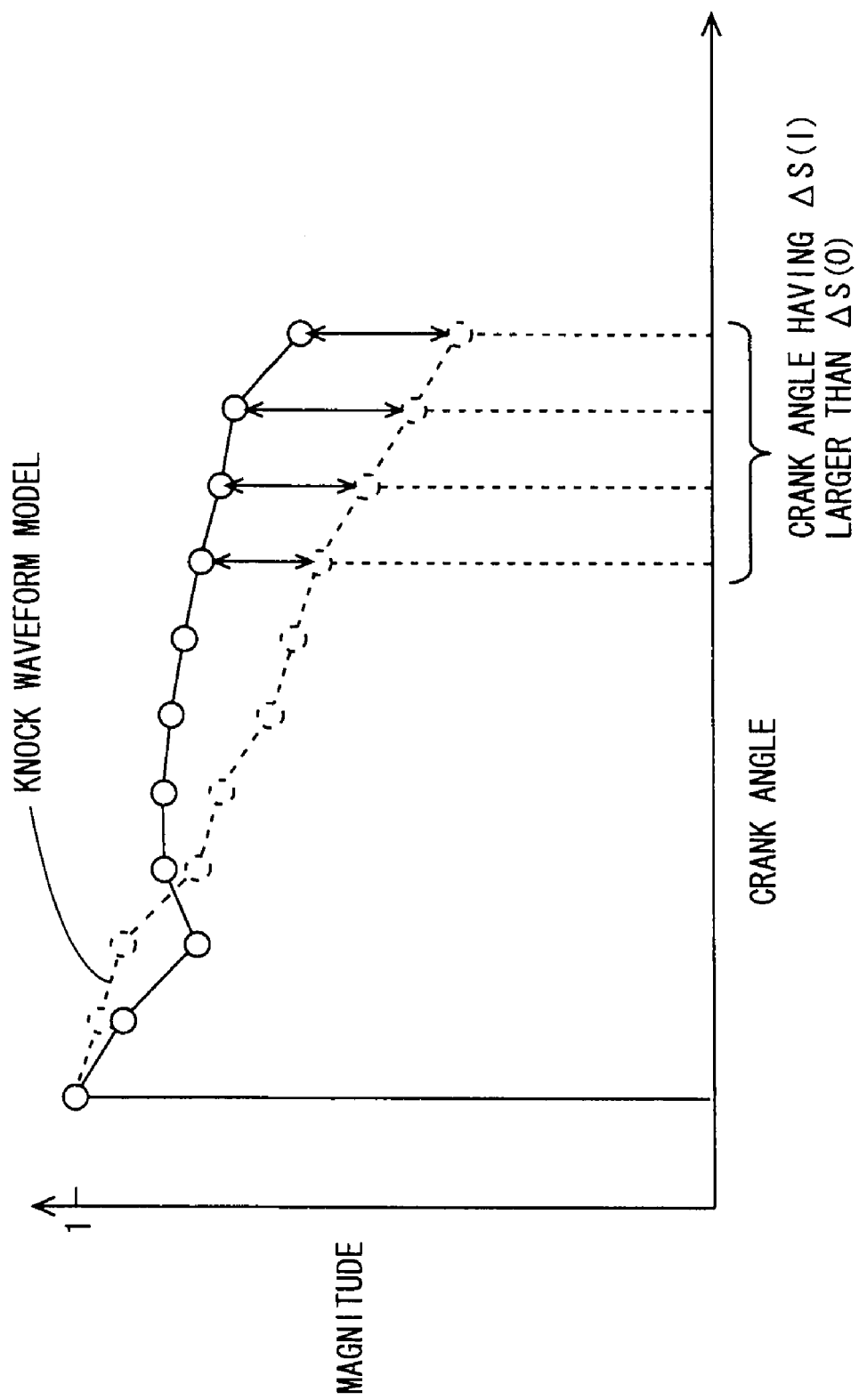
FIG. 25 is a chart (No. 7) for comparing the vibration waveform in third frequency band C and the knock waveform model.

As shown in FIG. 25, in the case where there are absolute values ΔS(I) larger than threshold value ΔS(0) (NO in S202) and the number of absolute values ΔS(I) is "4" (is larger than "3") (NO in S300) as a result of the fact that the resultant vibration waveform is significantly different from the knock waveform model, there is a high possibility that the resultant vibration waveform includes no vibration generated due to noise.

Accordingly, engine ECU 200 compares the resultant vibration waveform with the knock waveform model to calculate correlation coefficient K without correcting the vibration waveform (S312). Thus, engine ECU 200 can reduce error determination that knocking occurs although no knocking occurs.

Thereafter, if engine ECU 200 does not tentatively determine that knocking occurs (NO in S400), that is, if engine ECU 200 determines that no knocking occurs, the processing is completed without calculation of knock magnitude N. In other words, calculated correlation coefficient K is used only for forming the frequency distribution described above (see FIG. 14). Thus, engine ECU 200 can prevent unnecessary processing from being performed.

On the other hand, if engine ECU 200 tentatively determines that knocking occurs (YES in S400), then, engine ECU 200 calculates knock magnitude N. Knock magnitude N is calculated with the integrated values in the composite waveform in first frequency band A and second frequency band B.

Figure 26:
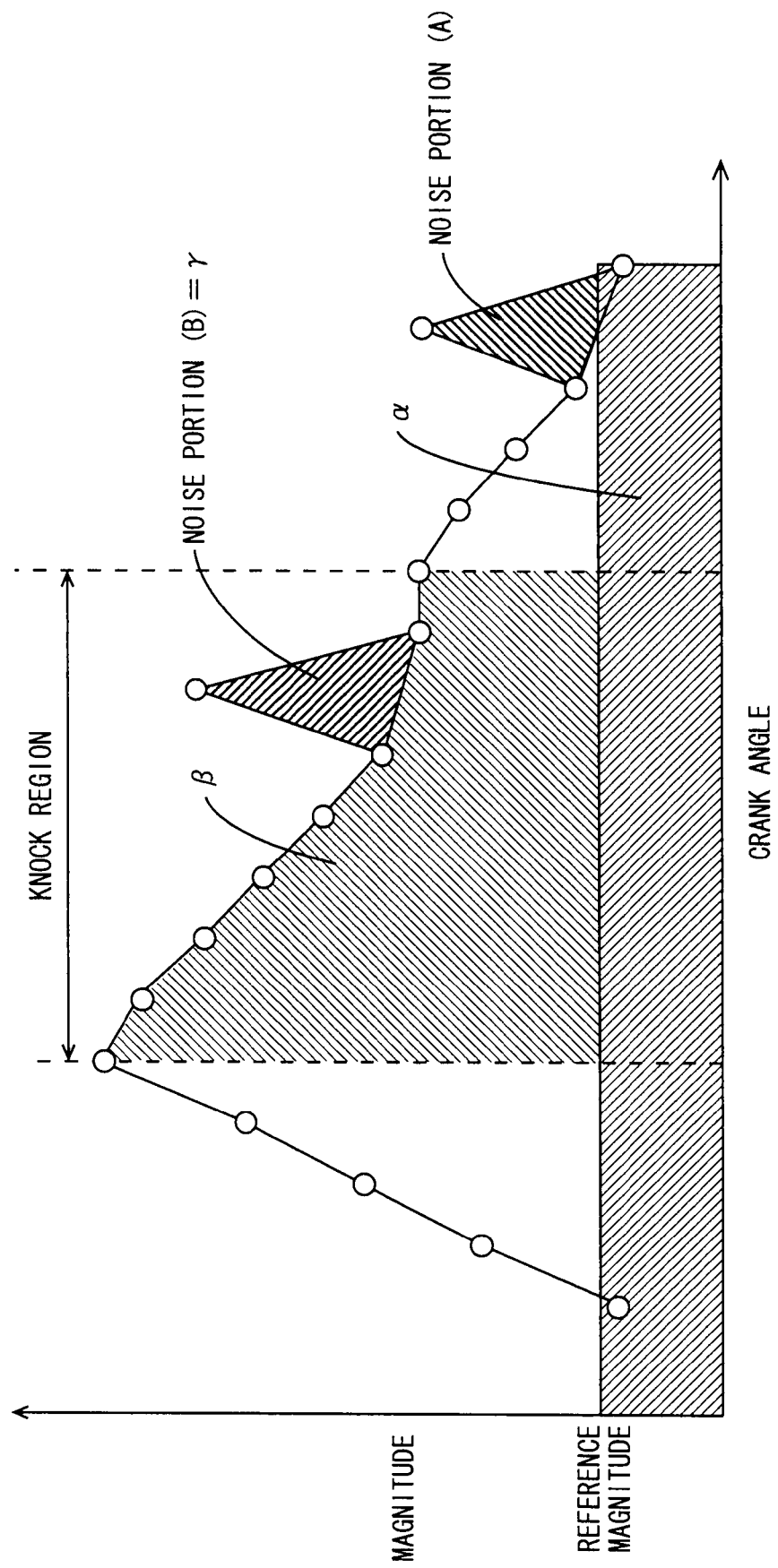
FIG. 26 is a chart (No. 2) showing a composite waveform in first frequency band A and second frequency band B, which is used for calculating knock magnitude N.

As shown in FIG. 26, the composite waveform in first frequency band A and second frequency band B may contain a noise portion (A) and a noise portion (B) each corresponding to a vibration generated due to noise. In order to remove these noise portions, engine ECU 200 calculates knock magnitude N from the equation, N=(α+(β−γ)×K)/α, where α represents the value obtained by summing (integrating) the reference magnitude for every crank angle of 90°, β represents the portion where the integrated value is larger than the reference magnitude in the knock region, γ represents the correction amount, and K represents the correlation coefficient (S400).

More specifically, engine ECU 200 calculates knock magnitude N using portion β having the integrated value which is larger than the reference magnitude in the knock region where the magnitude of the vibration generated due to knocking is large. On the other hand, engine ECU 200 calculates knock magnitude N without using the portion having the integrated value which is larger than the reference magnitude in a region other than the knock region (a region which is obtained by removing the knock region from the knock detection gate and has a small magnitude of a vibration generated due to knocking as compared with the knock region). Thus, engine ECU 200 can remove noise portion (A) in FIG. 26 located out of the knock region. Therefore, engine ECU 200 can remove the integrated values considered due to noise because the large integrated value is calculated, in the region where a magnitude of a vibration generated due to knocking is small.

Moreover, engine ECU 200 subtracts correction amount γ from portion β having the integrated value larger than the reference magnitude in the knock region to calculate knock magnitude N. Thus, engine ECU 200 can remove noise portion (B) in FIG. 26 located within the knock region. Therefore, engine ECU 200 can remove the integrated values considered due to noise from the waveform shape, in the region where a magnitude of a vibration generated due to knocking is large.

In the case where knock magnitude N calculated as described above is larger than determination value V(KX) (YES in S402), engine ECU 200 determines that knocking occurs (S404), and retards the ignition timing (S406). Thus, engine ECU 200 can reduce occurrence of knocking.

On the other hand, in the case where knock magnitude N is not larger than determination value V(KX) (NO in S402), engine ECU 200 determines that no knocking occurs (S408), and advances the ignition timing (S410). As described above, engine ECU 200 compares knock magnitude N with determination value V(KX) to determine whether or not knocking occurs, for every ignition cycle, and retards or advances the ignition timing.

As described above, the engine ECU which is the knocking determination apparatus according to the present embodiment determines whether or not the number of integrated values larger than the tentative knock determination value is equal to or more than the predetermined number with regard to the vibrations in fourth frequency band D including the resonant frequency of the engine itself. In the case where knocking occurs, the vibrations in fourth frequency band D are sustained. On the other hand, in the case where the vibration in fourth frequency band D is generated due to noise and is relatively low in magnitude, then, the vibration is not sustained. Therefore, in the case where the number of integrated values larger than the tentative knock determination value is equal to or more than the predetermined number, there is a high possibility that knocking occurs. Accordingly, in the case where the number of integrated values larger than the tentative knock determination value is equal to or more than the predetermined number, engine ECU 200 tentatively determines that knocking occurs. Thus, engine ECU 200 can distinguish a vibration which is generated due to noise and is relatively low in magnitude from a vibration which is generated due to knocking and can determine occurrence of knocking with good accuracy.

In the present embodiment, engine ECU 200 multiplies the minimum value of the integrated value in fourth frequency band D at the knock detection gate by coefficient Y (Y is a positive value) to calculate the tentative knock determination value. Alternatively, engine ECU 200 may add a standard deviation of the integrated values in fourth frequency band D in the knock detection gate to the minimum value of the integrated values in fourth frequency band D in the knock detection gate to calculate the tentative knock determination value.

Still alternatively, engine ECU 200 may add the standard deviation of the integrated values in fourth frequency band D at the knock detection gate to the median value of the integrated values in fourth frequency band D in the knock detection gate to a median value of the integrated values in fourth frequency band D in the knock detection gate to calculate the tentative knock determination value.

Further, engine ECU 200 may add the standard deviation of the integrated values in fourth frequency band D in the knock detection gate, the predetermined value or the like to an average value of X (X is a positive integer) integrated values selected from the integrated values in the fourth frequency band D in the knock detection gate such that smaller integrated values are preferentially selected to calculate the tentative knock determination value.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A knocking determination apparatus for an internal combustion engine, comprising:
   a knock sensor that detects a magnitude of a vibration generated in said internal combustion engine; and
   a operating unit, wherein
   said operating unit detects magnitudes of vibrations in a frequency band which includes a resonant frequency of said internal combustion engine among vibrations generated due to knocking in said internal combustion engine, and determines whether or not knocking occurs, based on the magnitudes of the vibrations in the frequency band which includes the resonant frequency of said internal combustion engine.

2. The knocking determination apparatus for the internal combustion engine according to claim 1, wherein
   said operating unit detects the magnitudes of the vibrations in the frequency band which includes the resonant frequency of said internal combustion engine at a plurality of times among the vibrations generated due to the knocking in said internal combustion engine in correspondence with a crank angle, and determines whether or not knocking occurs, based on whether or not the magnitudes which are larger than a predetermined threshold value are detected by a number which is equal to or more than a predetermined number.

3. The knocking determination apparatus for the internal combustion engine according to claim 2, wherein
   said operating unit detects waveforms of vibrations in a frequency band which does not include the resonant frequency of said internal combustion engine among the vibrations generated due to the knocking in said internal combustion engine, determines that no knocking occurs in a case where the magnitudes which are larger than said predetermined threshold value are not detected by a number which is equal to or more than said predetermined number, and further determines whether or not knocking occurs based on said waveforms in a case where the magnitudes which are larger than said predetermined threshold value are detected by a number which is equal to or more than said predetermined number.

4. The knocking determination apparatus for the internal combustion engine according to claim 2, wherein
   said operating unit calculates as said threshold value a value which is larger by a predetermined value than a minimum value of the magnitudes of the vibrations in the frequency band which includes the resonant frequency of said internal combustion engine.

5. The knocking determination apparatus for the internal combustion engine according to claim 2, wherein
   said operating unit calculates as said threshold value a value which is larger by a predetermined value than a median value of the magnitudes of the vibrations in the frequency band which includes the resonant frequency of said internal combustion engine.

6. The knocking determination apparatus for the internal combustion engine according to claim 2, wherein
said operating unit calculates as said threshold value a value which is larger by a predetermined value than an average value of a predetermined number of magnitudes selected from the magnitudes of the vibrations in the frequency band which includes the resonant frequency of said internal combustion engine such that smaller magnitudes are selected preferentially.

7. A knocking determination method for an internal combustion engine, comprising:
detecting magnitudes of vibrations in a frequency band which includes a resonant frequency of said internal combustion engine among vibrations generated due to knocking in said internal combustion engine; and
determining whether or not knocking occurs, based on the magnitudes of the vibrations in the frequency band which includes the resonant frequency of said internal combustion engine.

8. The knocking determination method for the internal combustion engine according to claim 7, wherein
the detecting the magnitudes of the vibrations in the frequency band which includes the resonant frequency of said internal combustion engine includes detecting the magnitudes of the vibrations in the frequency band which includes the resonant frequency of said internal combustion engine at a plurality of times among the vibrations generated due to the knocking in said internal combustion engine in correspondence with a crank angle, and
the determining whether or not knocking occurs includes determining whether or not knocking occurs, based on whether or not the magnitudes which are larger than a predetermined threshold value are detected by a number which is equal to or more than a predetermined number.

9. The knocking determination method for the internal combustion engine according to claim 8, further comprising detecting waveforms of vibrations in a frequency band which does not include the resonant frequency of said internal combustion engine among the vibrations generated due to the knocking in said internal combustion engine, wherein
the determining whether or not knocking occurs includes:
determining that no knocking occurs in a case where the magnitudes which are larger than said predetermined threshold value are not detected by a number which is equal to or more than said predetermined number; and
further determining whether or not knocking occurs based on said waveforms in a case where the magnitudes which are larger than said predetermined threshold value are detected by a number which is equal to or more than said predetermined number.

10. The knocking determination method for the internal combustion engine according to claim 8, further comprising calculating as said threshold value a value which is larger by a predetermined value than a minimum value of the magnitudes of the vibrations in the frequency band which includes the resonant frequency of said internal combustion engine.

11. The knocking determination method for the internal combustion engine according to claim 8, further comprising calculating as said threshold value a value which is larger by a predetermined value than a median value of the magnitudes of the vibrations in the frequency band which includes the resonant frequency of said internal combustion engine.

12. The knocking determination method for the internal combustion engine according to claim 8, further comprising calculating as said threshold value a value which is larger by a predetermined value than an average value of a predetermined number of magnitudes selected from the magnitudes of the vibrations in the frequency band which includes the resonant frequency of said internal combustion engine such that smaller magnitudes are selected preferentially.

13. A knocking determination apparatus for an internal combustion engine, comprising:
detection means for detecting magnitudes of vibrations in a frequency band which includes a resonant frequency of said internal combustion engine among vibrations generated due to knocking in said internal combustion engine; and
determination means for determining whether or not knocking occurs, based on the magnitudes detected by said detection means.

14. The knocking determination apparatus for the internal combustion engine according to claim 13, wherein
said detection means includes means for detecting the magnitudes of the vibrations in the frequency band which includes the resonant frequency of said internal combustion engine at a plurality of times among the vibrations generated due to the knocking in said internal combustion engine in correspondence with a crank angle, and
said determination means includes means for determining whether or not knocking occurs, based on whether or not the magnitudes which are larger than a predetermined threshold value are detected by a number which is equal to or more than a predetermined number.

15. The knocking determination apparatus for the internal combustion engine according to claim 14, further comprising means for detecting waveforms of vibrations in a frequency band which does not include the resonant frequency of said internal combustion engine among the vibrations generated due to the knocking in said internal combustion engine, wherein
said determination means includes:
means for determining that no knocking occurs in a case where the magnitudes which are larger than said predetermined threshold value are not detected by a number which is equal to or more than said predetermined number; and
means for further determining whether or not knocking occurs based on said waveforms in a case where the magnitudes which are larger than said predetermined threshold value are detected by a number which is equal to or more than said predetermined number.

16. The knocking determination apparatus for the internal combustion engine according to claim 14, further comprising means for calculating as said threshold value a value which is larger by a predetermined value than a minimum value of the magnitudes detected by said detection means.

17. The knocking determination apparatus for the internal combustion engine according to claim 14, further comprising means for calculating as said threshold value a value which is larger by a predetermined value than a median value of the magnitudes detected by said detection means.

18. The knocking determination apparatus for the internal combustion engine according to claim 14, further comprising means for calculating as said threshold value a value which is larger by a predetermined value than an average value of a predetermined number of magnitudes selected from the magnitudes of the vibrations detected by said detection means such that smaller magnitudes are selected preferentially.

* * * * *